United States Patent
Welch et al.

[11] Patent Number: 5,975,237
[45] Date of Patent: Nov. 2, 1999

[54] REINFORCING STRUCTURE FOR ENGINE NACELLE ACOUSTIC PANEL

[75] Inventors: John M. Welch; Thomas D. Popp, both of Wichita; Robert F. Wikstrom, Derby; Terry W. Stratton, Rose Hill; Brian R. Kitt, Wichita, all of Kans.

[73] Assignee: The Boeing Company, Seattle, Wash.

[21] Appl. No.: 09/026,189

[22] Filed: Feb. 19, 1998

Related U.S. Application Data

[60] Provisional application No. 60/054,205, Jul. 30, 1997.

[51] Int. Cl.$^6$ ........................................................ E04B 1/82
[52] U.S. Cl. ........................... 181/290; 181/292; 181/213
[58] Field of Search .................................... 181/213, 214, 181/286, 288, 290, 292, 294; 428/73, 116, 117, 118

[56] References Cited

U.S. PATENT DOCUMENTS

| | | |
|---|---|---|
| 4,026,105 | 5/1977 | James . |
| 4,030,290 | 6/1977 | Stachowiak . |
| 4,043,522 | 8/1977 | Vetter . |
| 4,232,513 | 11/1980 | Pearson et al. . |
| 4,235,303 | 11/1980 | Dhoore et al. . |
| 4,421,201 | 12/1983 | Nelsen et al. . |
| 4,463,552 | 8/1984 | Monhardt et al. . |
| 4,465,725 | 8/1984 | Riel .......................................... 181/292 |
| 4,495,764 | 1/1985 | Gnagy . |
| 4,539,244 | 9/1985 | Beggs et al. . |
| 4,564,160 | 1/1986 | Vermilye . |
| 4,600,619 | 7/1986 | Chee et al. . |
| 4,779,240 | 10/1988 | Dorr . |
| 4,825,644 | 5/1989 | Bubello et al. . |
| 4,852,805 | 8/1989 | Vermilye . |
| 5,054,281 | 10/1991 | Mutch . |
| 5,498,462 | 3/1996 | Darfler . |
| 5,776,579 | 7/1998 | Jessup et al. ........................... 181/292 |
| 5,782,082 | 7/1998 | Hogeboom et al. .................... 181/213 |

FOREIGN PATENT DOCUMENTS

3625534 A1  11/1988  Germany .

*Primary Examiner*—Khanh Dang
*Attorney, Agent, or Firm*—Christensen O'Connor Johnson & Kindness PLLC

[57] ABSTRACT

An improved acoustic panel (26) for the nacelle (20) of a high bypass jet engine. The acoustic panel (26) has a perforated composite inner sheet (54), an outer composite sheet (96, 98), and a new reinforcement structure, or pre-cured doubler (62) therein. The pre-cured doubler (62) is arranged to receive a load applied to the acoustic panel (26), and includes a face sheet (64) connected to a structural attachment area (52) of the perforated composite inner sheet (54). A structurally-reinforced core (63) is connected the face sheet (64). Preferably, the width of the face sheet (64) in an air flow direction of the acoustic panel (26) is substantially equal to the width of the structurally reinforced core (63) in the air flow direction. The pre-cured doubler (62) provides increase acoustic area in parts of the acoustic panel adjacent to attachment fittings (46). Expanded epoxy (87*a*) is also used to reinforce side edges and selected areas of the acoustic core (60) for the acoustic panel (26).

35 Claims, 19 Drawing Sheets

REINFORCING STRUCTURE FOR ENGINE NACELLE ACOUSTIC PANEL

REFERENCE TO RELATED APPLICATION

This application claims the benefit of U.S. Provisional Application No. 60/054,205, filed Jul. 30, 1997.

FIELD OF THE INVENTION

This invention is directed to a thrust reverser assembly for a high bypass jet engine, and more specifically, a method for forming an acoustic panel for a thrust reverser assembly.

BACKGROUND OF THE INVENTION

Airplane manufacturers are under increasing pressure to produce lightweight, strong, and durable aircraft at the lowest cost for manufacture and lifecycle maintenance. An airplane must have sufficient structural strength to withstand stresses during flight, while being as light as possible to maximize the performance of the airplane. To address these concerns, aircraft manufacturers have increasingly used fiber-reinforced resin matrix composites.

These composites provide improved strength, fatigue resistance, stiffness, and strength-to-weight ratio by incorporating strong, stiff, carbon fibers into a softer, more ductile resin matrix. The resin matrix material transmits forces to the fibers and provides ductility and toughness, while the fibers carry most of the applied force. Unidirectional continuous fibers can produce anisotropic properties, while woven fabrics produce quasi-isotropic properties. Honeycomb core is often sandwiched between composite sheets to provide stiff panels having the highest specific strength.

Because of the noise regulations governing commercial transport aircraft, high bypass engines incorporate acoustic panels within the nacelles. Conventionally, these elements are made with an inner perforated skin, a surrounding buried septum honeycomb core, and a non-perforated outer skin, such as described in U.S. Pat. Nos. 4,600,619; 4,421,201; 4,235,303; 4,257,998; and 4,265,955, which we incorporate by reference. The inner and outer skins are metal, usually aluminum, or composite, and the honeycomb core is either aluminum or composite. Manufacturing these acoustic panels is a challenge because of their size, their complex curvature and the close tolerances necessary for them to function properly.

As shown in FIG. 1, a nacelle 10 for a commercial high bypass jet engine includes a thrust reverser assembly having a fore-and-aft translating sleeve 11 to cover or expose thrust reverser cascades 12 when deploying thrust reverser blocker doors 15 carried on the translating sleeve. The thrust reverser assembly is positioned just aft of a jet engine, not shown, as is used on an airplane. The thrust reverser assembly is fitted within the nacelle 10. The thrust reverser cascades 12 are circumferentially spaced around the interior of the nacelle.

During normal flying operations the translating sleeve 11 is in a closed, or forward, position to cover the thrust reverser cascades 12. For landing an airplane, the translating sleeve 11 is moved from the closed position to the rearwardly extended, or deployed, position by means of actuator rods 18. This positioning routes exhaust gas to flow through the thrust reverser cascades 12 so as to slow down the aircraft on the ground. Exhaust is rerouted through the thrust reverser cascades 12 by closing the circumferentially positioned blocker doors 15.

The translating sleeve 11 is usually formed from a pair of semi-cylindrical outer cowl panels 13 (only one shown in FIG. 2) and a pair of semi-cylindrical inner acoustic panels 14 (only one shown in FIG. 2) bonded together to form the aft portion of the cylindrical nacelle 10. The outer cowl and acoustic panels 13, 14 are bonded at their aft ends and branch or diverge to provide a chamber for containing and concealing the thrust reverser cascades 12 and the associated support structures.

When the translating sleeve 11 is in the stowed position (FIG. 2), the leading ends of the acoustic panel 14 and the outer cowl panel 13 extend on opposite sides of the thrust reverser cascades 12. When the thrust reverser is deployed, the translating sleeve 11 is moved aft to expose the cascades 12 FIG. 3). The fan duct blocker doors 15 at the forward end of the acoustic panel 14 are deployed to divert fan flow through the cascades 12. The blocker door assembly is described in U.S. Pat. No. 4,852,805.

To form an acoustic composite sandwich panel, prior art methods used a male lay-up mandrel. The perforated composite inner skin was laid against the upper surface of the mandrel and buried septum honeycomb core was laid over the inner perforated skin. A composite non-perforated skin was then laid over the honeycomb core, and the three layers were cured or co-cured so as to form a single part.

This method did not provide index control for the inner or outer surface of the perforated sheets. Inexact tolerances on the inner and outer surfaces made locating and attaching details on the inside or outside of the acoustic panel difficult.

Thermal residual stresses produced during the curing process caused the acoustic panels to warp. Although the warpage was predictable to some extent, it was usually not uniform over the entire surface, leaving the part less than the desired design shape. Joining the acoustic panel and the outer cowl panel at a continuous aft joint with a smooth connection was difficult. Significant rework and shimming were required to correctly position the outer cowl panel and attach fittings against the outer side of the warped acoustic panel to complete the connection. Resin flowed into the perforations of the honeycomb core during the curing process, requiring rework of the perforated surface.

The acoustic panel must include recesses for receiving the fan duct blocker doors to provide a streamlined continuation during normal operation of the engine. In addition, deployment of the fan duct blocker doors imposes large bending moments at the leading end of the acoustic panel. As can be seen in FIG. 2, to receive the fan duct blocker doors 15 and to oppose the load of the fan duct blocker doors 15 when the thrust reverser is deployed, prior art acoustic panels 14 typically included a separate diaphragm 16 that was fastened at the leading end of the acoustic panel 14, and reinforced by gussets (not shown). An aft ring 17 extended between the acoustic panel 14 and the diaphragm 16. The blocker doors 15 were hinged from the leading end of the diaphragm 16. A forward ring 18, sometimes called a "bullnose ring", extended from the leading edge of the diaphragm 16 toward the thrust reverser cascades 12.

Because the gussets, the forward ring 18, the aft ring 17, and the diaphragm 16 were separate pieces, assembly of the thrust reverser and acoustic panel was laborious. The associated fasteners and connecting parts added significant weight to the acoustic panel 14. The steep angles formed by forward and aft rings deterred anyone from trying to form them in a single piece. Reducing the number of parts will reduce assembly time and will improve performance because an integral part made to close tolerance with the method of the present invention will be more aerodynamically efficient.

The fan duct blocker doors 15 fold downward and fit within recesses on the inner side of the acoustic panel. The blocker doors are trapezoidal so when stored, they create a triangular gap that needed to be filled for proper efficient airflow. The triangular gaps were filled by separate "wedge fairings" that were difficult to install with precision. The wedge fairings did not provide significant sound absorption. Attempts to form the wedge fairings integrally with the acoustic panel have not been successful.

The acoustic panels usually require reinforcement in the areas of attachment so that stresses applied by fittings attached to the acoustic panel will not damage the skins or core during sustained ultimate loads. To provide support at areas of fastened detail, prior art added plies to the skins to make the areas for fastening thicker than surrounding areas of the panel. The plies decreased in width so that the edges of the added plies formed "steps" or "ramps". The ramps help to dissipate forces applied through the fasteners into the skin. The presence of extra composite material at the ramps meant that perforations cannot be practically provided in the area covered by the ramps. Therefore, use of the ramps decreases the sound absorption area of the acoustic panel. There is a need for an acoustic panel that provides reinforcement in areas of fastened detail with a minimal loss of acoustic absorbing area.

Because the buried septum honeycomb core has little compressive and shear strength in directions parallel to the panel surface, it is often necessary to reinforce the honeycomb core in areas around fasteners and along the edges of the panels. Often, a dense core is substituted for the honeycomb core in the area to receive a fastener. Alternatively, portions of the honeycomb core can be removed and replaced by a potting compound. Potting compounds are also used along the edges of the panels. Each of these solutions poses problems. Dense cores are expensive and require additional processing steps to insert. Potting compounds are heavy, often disconnect with the composite skins, and require extensive labor to apply. There is a need for a more efficient way of providing support for a fastener in a composite. In addition, there is a need for a more efficient manner of providing solid edges ("closeouts") for a panel.

Composite panels are often tested prior to use by ultrasonic inspection. During a typical ultrasonic inspection, a Through Transmission Ultrasonic (TTU) sender is mounted on the opposite side of honeycomb-core composite panel from a TTU receiver. The TTU sender and the TTU receiver each have a water column that extends to the honeycomb-core composite panel. The TTU sender sends a signal that propagates through its water column, through the honeycomb-core composite panel, through the water column of the TTU receiver, and to the TTU receiver. Variations in the signal resonant frequency received by the TTU receiver indicate either changes in internal structure of the panel or internal flaws within the composite assembly.

A problem occurs when the TTU sender and TTU receiver approach an area of angular change in the honeycomb-core composite panel. If the water column is not extending parallel to the surface of the part, the signal path can be altered, causing inaccurate data from the TTU printout. There is a need for a method of more accurately performing nondestructive inspection in areas of angular change in a honeycomb-core composite panel.

SUMMARY OF THE INVENTION

The present invention is an acoustic panel defining an air flow direction and having reinforced regions thereon. The acoustic panel includes a perforated composite inner sheet having a structural attachment area thereon, and a composite core arranged over the perforated composite inner sheet. An outer composite sheet is attached to the composite core. The composite core includes a first core section having a buried septum and a second core section arranged to receive a load applied to the acoustic panel. The second core section has a face sheet connected to the structural attachment area of the perforated composite inner sheet and a structurally-reinforced core material. The structurally-reinforced core material is connected to the face sheet. The width of the face sheet in the air flow direction is substantially equal to the width of the structurally reinforced core material in the air flow direction.

In accordance with another aspect of the present invention, the structural attachment area of the perforated composite inner sheet has a width in the air flow direction which is substantially equal to the width in the air flow direction of the face sheet connected to the structural attachment area. The relationship between the moduli of elasticity and thicknesses of the face sheet and the structural attachment area is preferably defined substantially by the formula:

$$E_d T_d = E_s T_s;$$

where Ed equals the modulus of elasticity of the second core section in the air flow direction, Td equals to thickness of the second core section, Es equals the modulus of elasticity of the structural attachment area in the air flow direction, and Ts equals the thickness of the structural attachment area.

In accordance with yet another aspect of the present invention, the face sheet comprises layers of carbon fiber/resin matrix sheets, and the layers of carbon fiber/resin matrix sheets are substantially equal in width in the airflow direction.

In accordance with other aspects of the present invention, the face sheet includes interwoven carbon fibers. The majority of the interwoven carbon fibers are aligned in the air flow direction.

In accordance with yet other aspects of the present invention, the structural attachment area comprises layers of carbon fiber/resin matrix sheets, and wherein the majority of the carbon fibers in the structural attachment area are aligned substantially plus/minus 45° to the air flow direction.

In accordance with still other aspects of the present invention, the second core section is attached to the structural attachment area by an elastomeric material. The elastomeric material is preferably a layer of epoxy adhesive that is approximately 0.015 inches thick.

In accordance with yet another aspect of the present invention, the perforations of the perforated composite inner sheet extend to adjacent to the face sheet.

In accordance with still another aspect of the present invention, the face sheet includes layers of carbon fiber/resin matrix sheets, and each of the layers is substantially equal in width in the airflow direction.

The present invention is also directed to an acoustic panel defining an air flow direction and having reinforced regions thereon. The acoustic panel includes a perforated composite inner sheet having perforations and a structural attachment area thereon and a reinforcement structure arranged to receive a load applied to the acoustic panel. The reinforcement structure includes a face sheet connected to the structural attachment area of the perforated composite inner sheet and arranged over the perforated composite inner sheet. An outer composite sheet is arranged over the composite core.

The relationship between the moduli of elasticity and thicknesses of the reinforcement structure and the structural attachment area is defined substantially by the formula:

$$EdTd = EsTs;$$

where Ed equals the modulus of elasticity of the reinforcement structure in the air flow direction, Td equals to thickness of the reinforcement structure, Es equals the modulus of elasticity of the structural attachment area in the air flow direction, and Ts equals the thickness of the structural attachment area.

The present invention also provides a sandwich panel having an inner composite sheet, a honeycomb core having cells extending substantially perpendicular to the inner composite sheet, and an outer composite sheet aligned against the outer side of the honeycomb core. Expanded and hardened epoxy is in the cells along the outer edges of the honeycomb core, the expanded and hardened epoxy extending from the inner composite sheet to the outer composite sheet so that the expanded and hardened epoxy forms outer edges of the sandwich panel. Alternatively, the expanded and hardened epoxy can be in pre-selected cells within the honeycomb core, the expanded and hardened epoxy extending from the inner composite sheet to the outer composite sheet, the pre-selected cells being arranged so that the expanded and hardened epoxy can receive a load applied to the acoustic panel and transmit the load to the inner composite sheet and the outer composite sheet.

The present invention also provides a method of forming a honeycomb core composite panel. The method includes providing a composite inner sheet, providing a honeycomb core having cells, and expanding epoxy into selected cells of the honeycomb core. The epoxy is cured in the selected cells so as to expand and harden the epoxy. The composite inner sheet is attached to the honeycomb core and a composite outer sheet is attached to the side of the honeycomb core opposite the composite inner sheet.

In accordance with another aspect of the present invention, the selected cells are along an edge of the honeycomb core composite panel, and the outer edges of the honeycomb core are machined so that the expanded and hardened epoxy forms side edges of the honeycomb core composite panel.

The present invention further provides a honeycomb core composite acoustic panel. The acoustic panel includes a composite inner sheet, a central honeycomb core attached to the outer surface of the composite inner sheet, the honeycomb core having cells extending substantially perpendicular to the surface of the composite inner sheet, and an outer composite sheet attached to the outer surface of the honeycomb core. The composite outer sheet extends substantially parallel to the composite inner sheet over the majority of the honeycomb core composite acoustic panel. The inner composite sheet rolls upward toward the outer composite sheet at one edge of the honeycomb core composite acoustic panel so that the honeycomb core decreases in height at the one edge. Expanded and hardened epoxy is provided in the cells at the one edge.

In accordance with other aspects of the present invention, the honeycomb composite panel is an acoustic panel.

In accordance with still other aspects of the present invention, the acoustic panel includes a forward ring and a diaphragm, the diaphragm extending from the forward ring rearward, and wherein the edge of the diaphragm closest to the forward ring is the one edge.

The present invention further provides an acoustic panel for a nacelle of a high bypass jet engine. The acoustic panel includes an inner surface configured to face a jet engine, an acoustic area extending along the inner surface, defined by perforations in the surface. The acoustic area includes greater than 60% of the inner surface, and preferably greater than 80% of the inner surface.

In accordance with yet another aspect of the present invention, the acoustic panel includes wedge fairings that extend over the inner surface.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
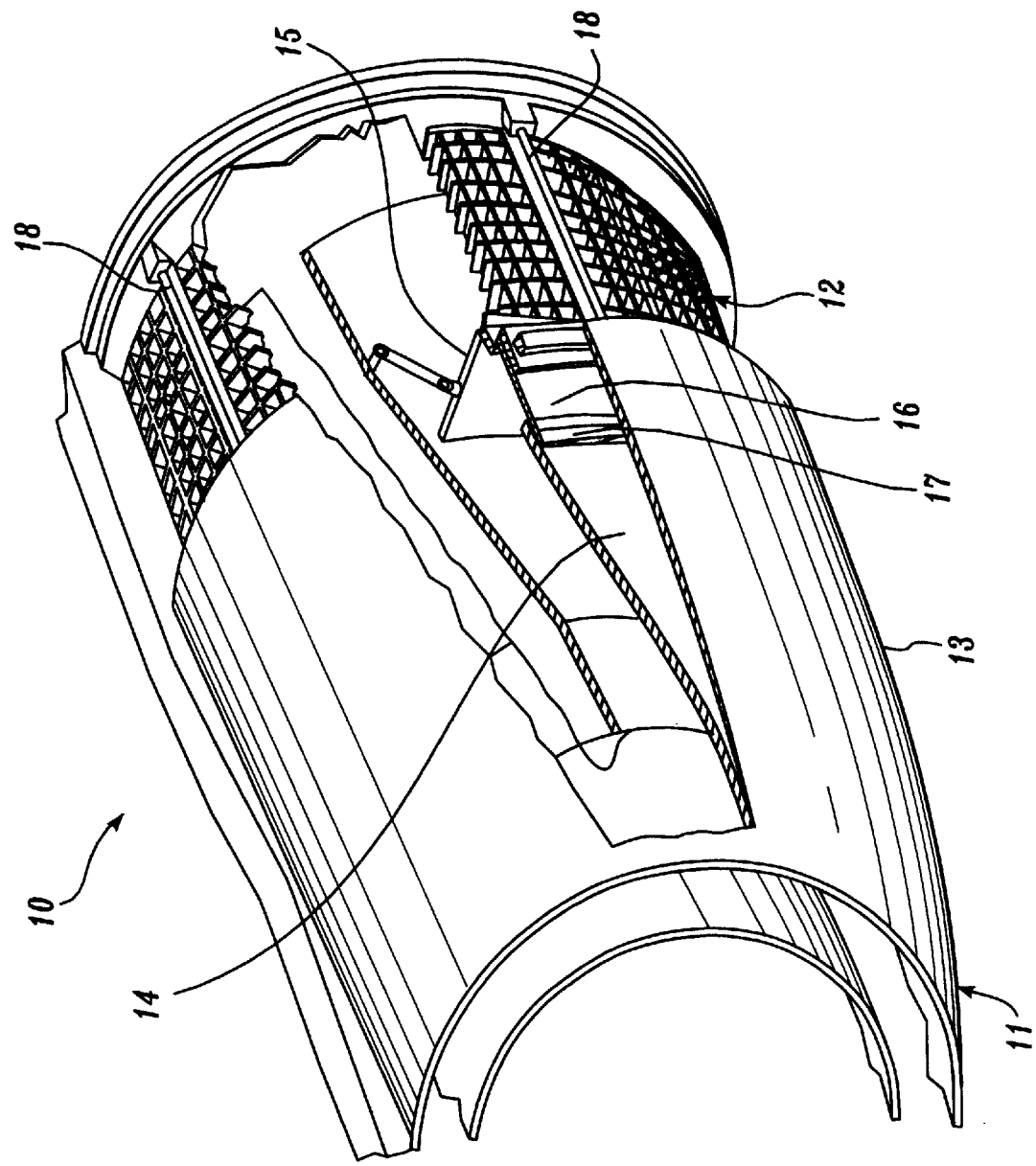
FIG. 1 is a fragmentary, partially cut-away pictorial view of a jet engine nacelle, illustrating a portion of a prior art jet engine thrust reverser assembly.
Figure 2:
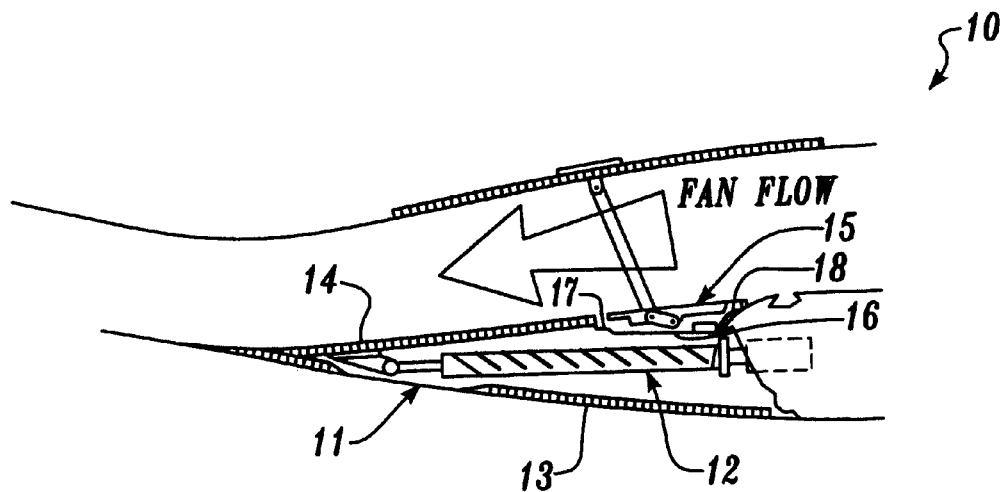
FIG. 2 is a cross-section, taken fore-to-aft, of a prior art translating sleeve and thrust reverser assembly, with the thrust reverser in the stored position.
Figure 3:
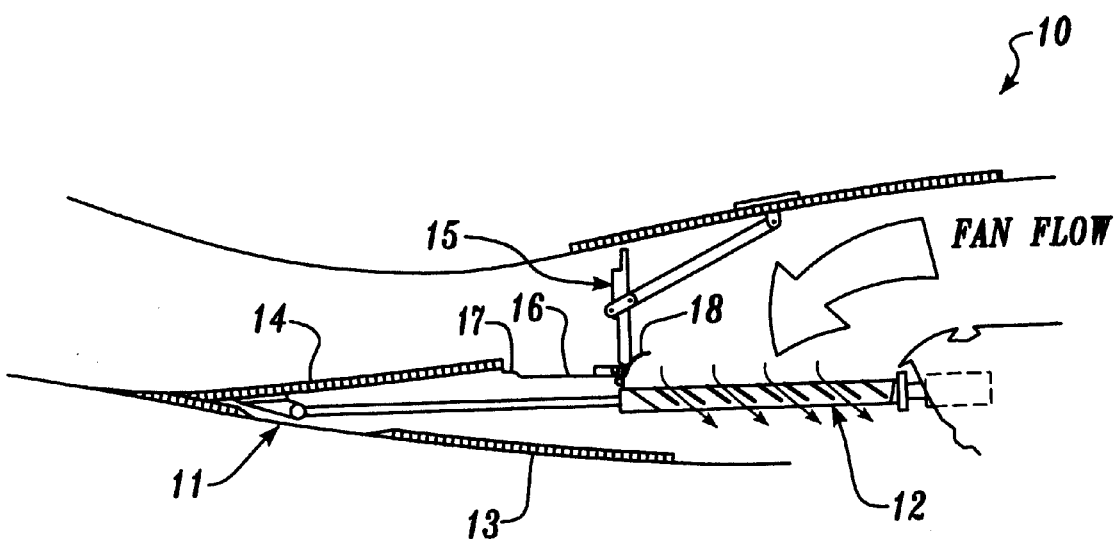
FIG. 3 is a cross-section, taken fore-to-aft, of a prior art translating sleeve and thrust reverser assembly, with the thrust reverser in the deployed position.
Figure 4:
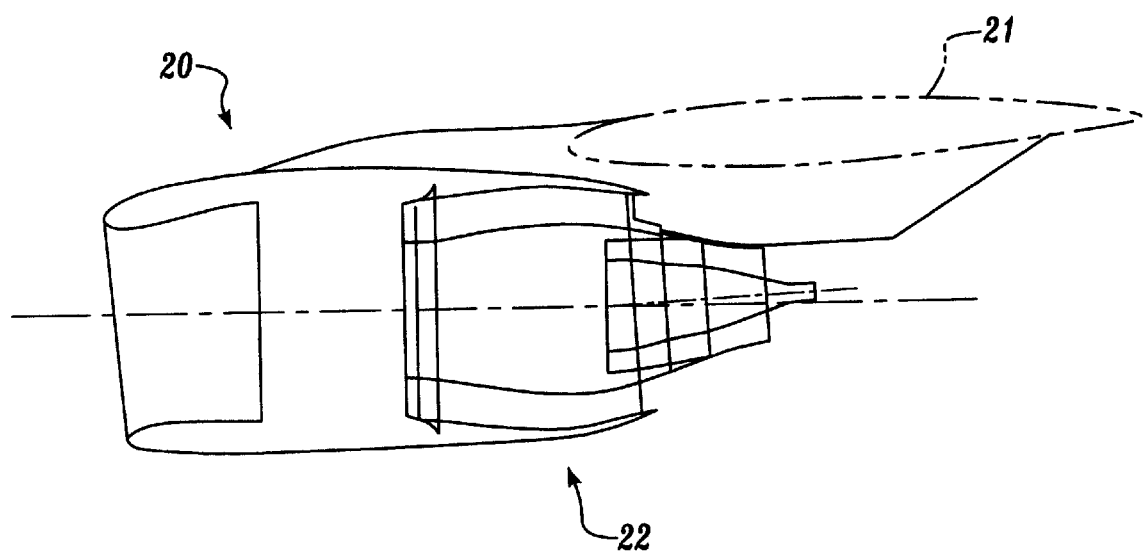
FIG. 4 is a side view of a nacelle incorporating the present invention.

Referring now to the drawings, in which like reference numerals represent like parts throughout the several views, FIG. 4 shows a nacelle 20 mounted by a strut under the wing 21 of an airplane. A translating sleeve 22 that is part of a thrust reverser assembly 23 (FIG. 5) is located at the aft portion of the nacelle 20.

Figure 6:
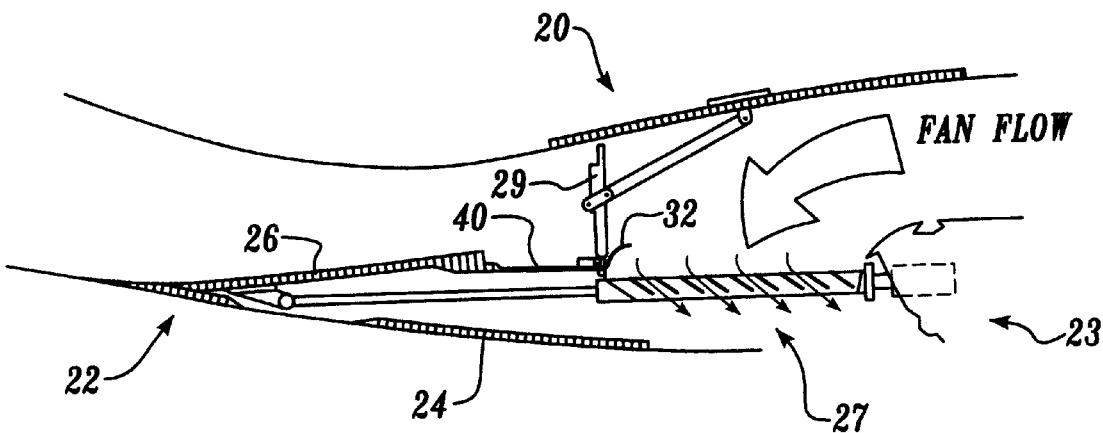
FIG. 6 is a cross-section, taken fore-to-aft, of the translating sleeve and thrust reverser assembly of the nacelle of FIG. 4, with the thrust reverser in the deployed position.

The generally semi-cylindrical translating sleeve 22 is formed by two outer cowl panels 24 (only one is shown in FIG. 6) and two inner acoustic panels 26 (only one shown). For ease of reference, only one of the outer cowl panels 24 and one of the acoustic panels 26, and their respective connections to each other, will be described. The other outer cowl panel 24 and other acoustic panel 26 are substantially the same as the outer cowl panel and acoustic panel described, but may be arranged differently because of the location within the nacelle 20 and the relative position of the panels in relation to the thrust reverser assembly 23.

Figure 5:
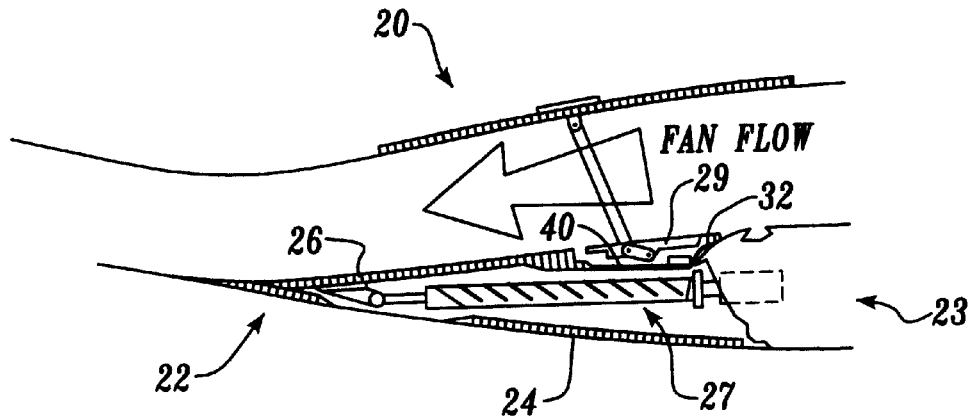
FIG. 5 is a cross-section, taken fore-to-aft, of the translating sleeve and thrust reverser assembly of the nacelle of FIG. 4, with the thrust reverser in the stored position.

The outer cowl panel 24 and the acoustic panel 26 are bonded at their aft ends and branch or diverge to provide a chamber for containing and concealing thrust reverser cascades 27 and the associated support structures. When the translating sleeve 22 is in the stowed position, the leading ends of the acoustic panel 26 and the outer cowl panel 24 extend on opposite sides of thrust reverser cascades 27 (FIG. 5). When the thrust reverser assembly 23 is deployed, the translating sleeve 22 moves aft to expose the thrust reverser cascades 27. During this movement, fan duct blocker doors 29 attached to the forward end of the acoustic panel 26 are deployed to direct fan flow through the thrust reverser cascades 27.

Figure 7:
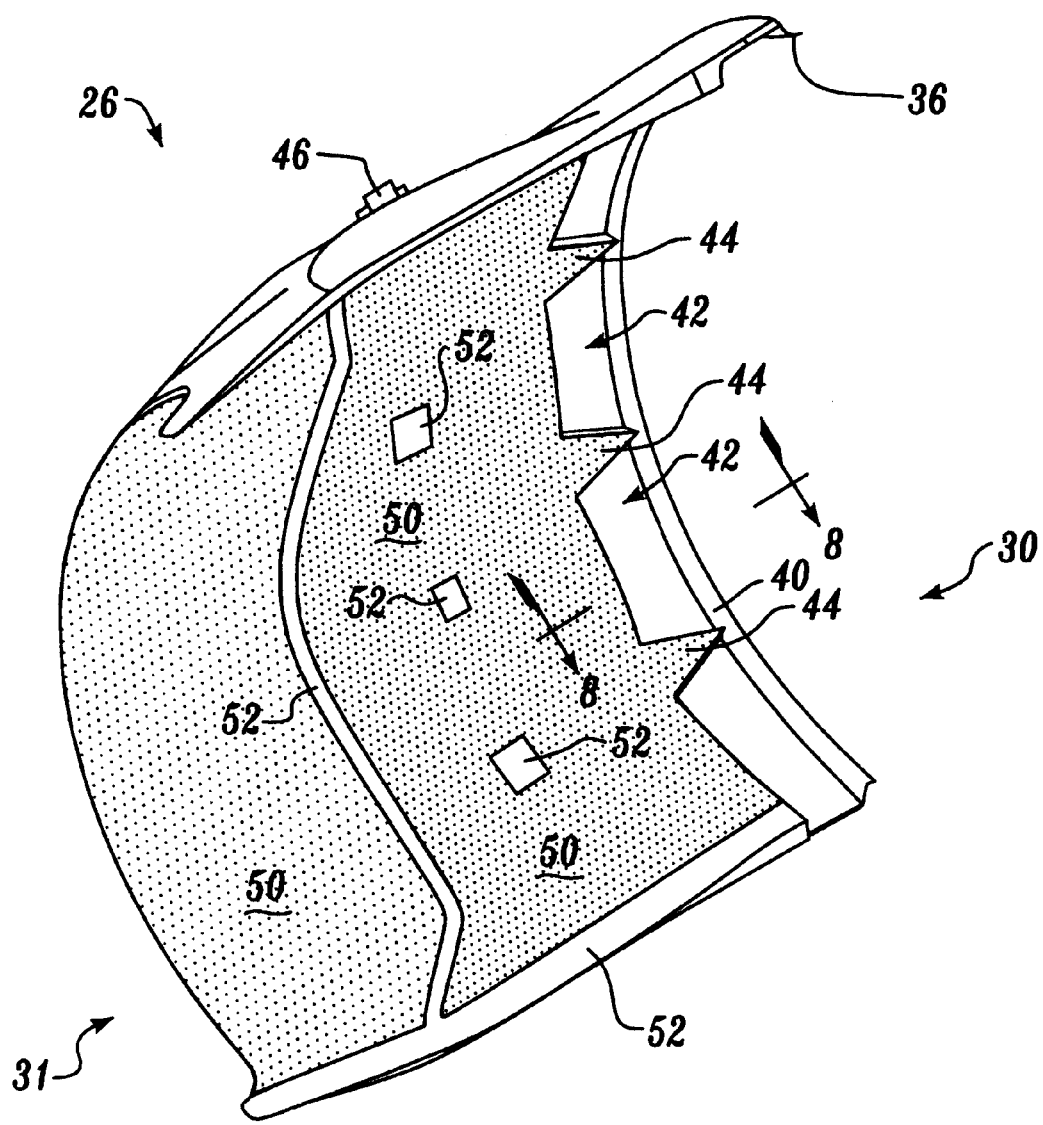
FIG. 7 is an isometric view of an acoustic panel for use in the nacelle of FIG. 4.
Figure 8:
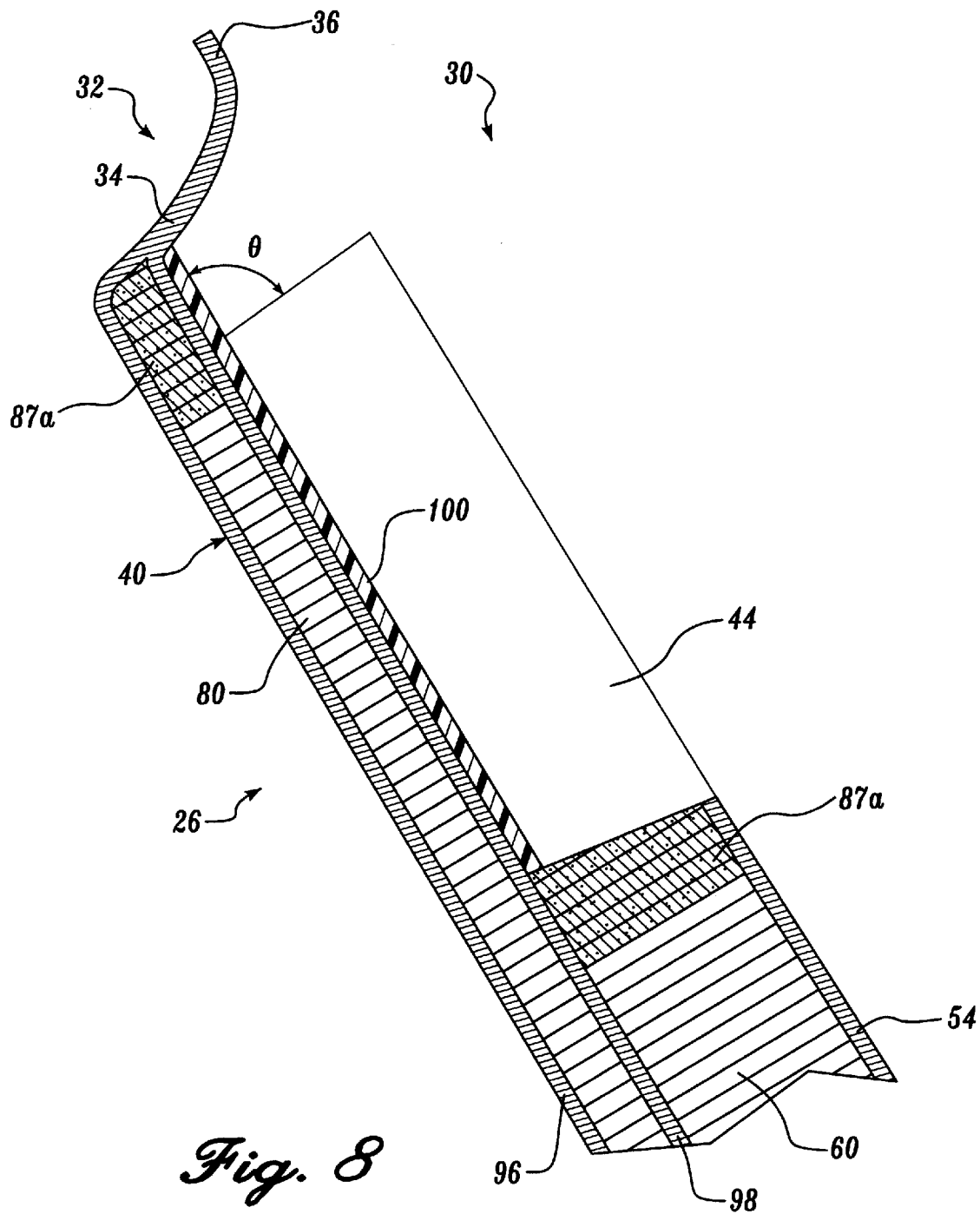
FIG. 8 is a sectional view of the acoustic panel of FIG. 7 taken along the section lines 8—8.

Referring now to FIG. 7, the acoustic panel 26 includes a leading end 30 and a trailing end 31. An integral forward ring 32 (FIG. 8) is located at the leading end 30 of the acoustic panel 26. The forward ring 32 extends downward and outward from the leading end 30 of the acoustic panel 26 and forms a nose 34 that extends outwards to a rolled lip 36. The nose 34 forms an approximate 67.5° angle to the plane of the acoustic panel 26, and the rolled lip forms an approximate 112.5° angle to the nose.

Just aft of the integral ring 32 is a diaphragm 40 (FIG. 7) having a number of recesses 42 (FIG. 7). The recesses 42 are arranged to receive the fan duct blocker doors 29 of the thrust reverser assembly 23. The fan duct blocker doors 29 (FIG. 5) are rotatably attached to hinge fitting assemblies (not shown) located at the forward end of the diaphragm 40 (FIG. 7).

As is known in the art, the shape of the fan duct blocker doors 29 required for proper translation of the fan duct blocker doors creates a triangular gap between the distal edges of adjacent fan duct blocker doors when the fan duct blocker doors are stowed. The triangular gaps between the fan duct blocker doors 29 are filled by wedge fairings 44 (FIG. 7) attached on the inner surface of the diaphragm. The wedge fairings 44 are formed integral with the acoustic panel 26.

A number of fittings 46 (FIG. 7—only one shown) are attached onto the outer surface of the acoustic panel 26. The fittings 46 are the attachment structure for the actuation assembly (not shown, but well known in the art) for the thrust reverser assembly 23 (FIG. 5).

The internal surface of the acoustic panel 26 (FIG. 7) includes perforations 50. The perforations 50 extend from the leading end of the acoustic panel 26, to and over the wedge fairings 44. Areas 52 of the internal surface of the acoustic panel 26 do not include perforations 50. The non-perforated areas 52 include structure (described in detail below) for supporting the fittings 46.

Figure 9:
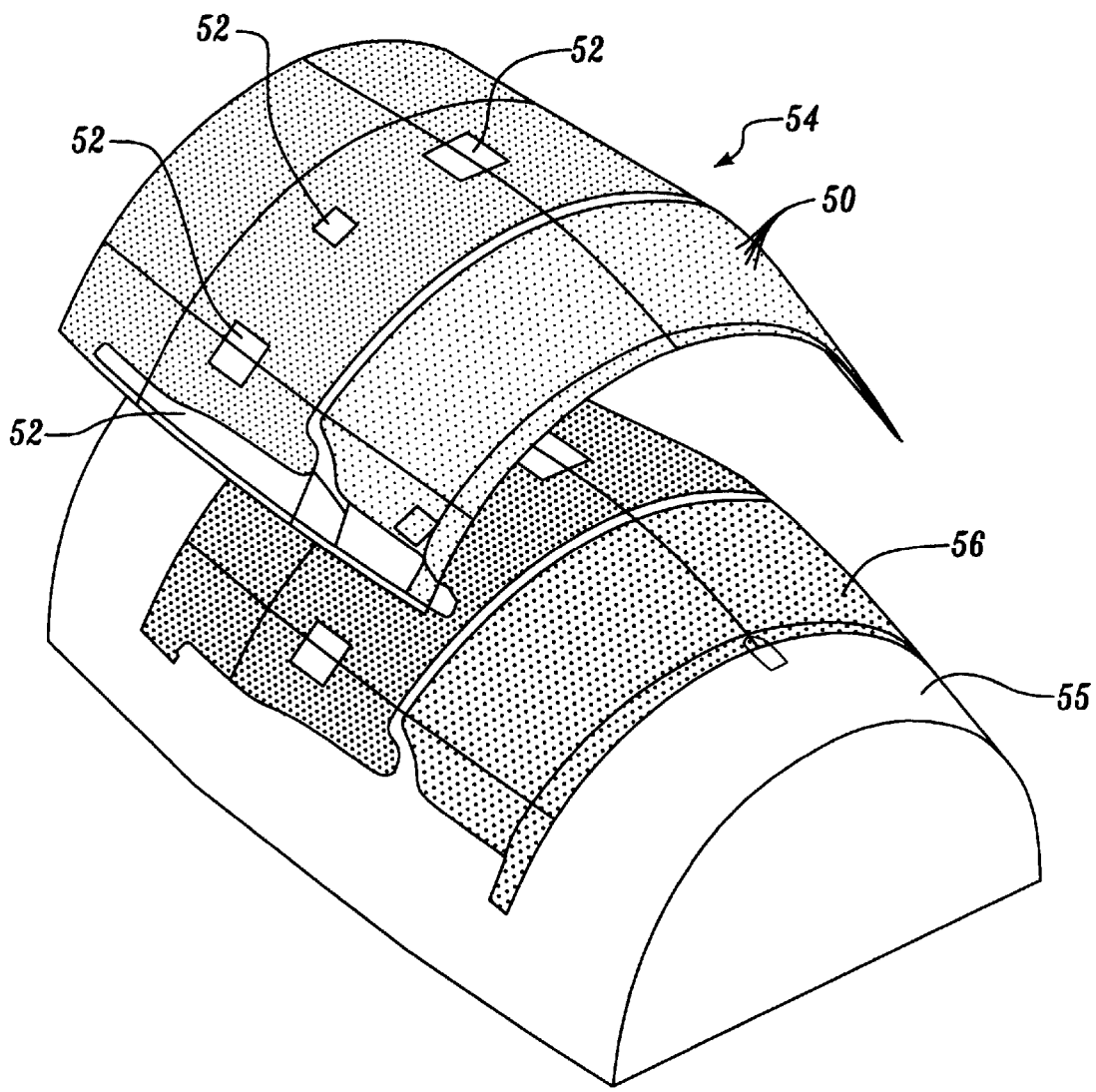
FIG. 9 is an isometric view showing an initial stage of assembly of the acoustic panel of FIG. 7 in which a perforated sheet has been formed and is removed from a pin mandrel.
Figure 10:
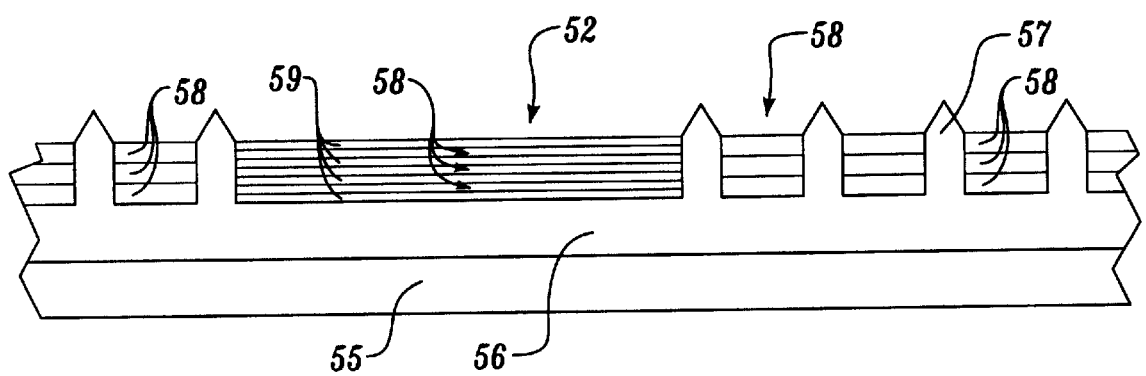
FIG. 10 is a diagrammatic view showing the forming of perforations in the perforated sheet of FIG. 9.

The acoustic panel 26 (FIG. 7) is formed in a number of stages shown in FIGS. 9–13, 15–21. In an initial stage shown in FIG. 9, a perforated sheet 54 is formed on a convex lay-up mandrel 55. A pin mat 56 is situated on the lay-up mandrel 55. Pins 57 extend orthogonally out of the pin mat 56 (FIG. 10). The pins 57 are arranged so as to correspond with the locations of the perforations 50 on the interior surface of the acoustic panel 26 (FIG. 9). Pins 57 are not included in the regions that correspond with the non-perforated areas 52 of the interior surface of the acoustic panel 26 (FIG. 7).

The perforated sheet 54 is preferably formed by a stack of three prepreg woven sheets 58 (FIG. 10). The prepreg woven sheets 58 are preferably interwoven graphite impregnated with an epoxy resin. At the non-perforated areas 52 where pins are not located on the pin mat 56, four layers of unidirectional tape 59 are stacked alternatingly with the prepreg woven sheets 58. The prepreg woven sheets 58 are preferably arranged so that the fibers in the top sheet are arranged at +/−45 degrees to the longitudinal axis of the lay-up mandrel 55, and the fibers in the middle and bottom prepreg sheets are arranged at 0/90 degrees to the longitudinal axis of the lay-up mandrel. The four layers of unidirectional tape 59 are preferably aligned alternatively at 0 and 90 degrees to the longitudinal axis of the lay-up mandrel 55. By arranging the unidirectional tape 59 and the prepreg woven sheets 58 in this manner, the perforated sheet 54 has the strongest tensile strength in both the air flow direction (fore-to-aft) and the semi-circular "hoop" direction of the acoustic panel 26. The function of the alignment of the fibers in the prepreg woven sheets 58 and the unidirectional tape 59 is described in detail below.

The prepreg woven sheets 58 are pressed onto the pin mat 56 (FIG. 9) by pressure rolling or another method known in the art. The entire structure is then bagged (not shown, but well known in the art) and placed in an autoclave (also not shown). The perforated sheet 54 is then staged, or partially cured, at 270° F. During the perforating and staging process, the perforated areas of the perforated sheet 54 swell so that the perforated areas of the sheet, despite being only three layers, are substantially the same thickness as the non-perforated areas 52 of the perforated sheet.

Figure 13:
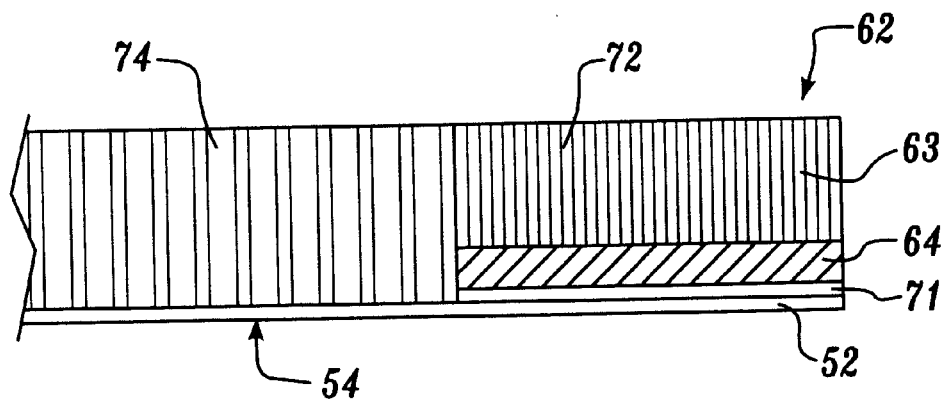
FIG. 13 is a cross-section, taken fore-to-aft, of an acoustic core for the acoustic panel of FIG. 7.

The perforated sheet 54 (FIG. 9) is used as the bottom layer in an acoustic core 60 (FIG. 18) that is formed in the build-up process shown in FIG. 13. As can best be seen in FIG. 13, pre-cured doublers 62 are attached to the non-perforated areas 52 of the perforated sheet 54. The pre-cured doublers 62 provide structural strength along the edges and at discrete attachment areas of the acoustic core 60 (FIG. 8) and for the attachment of the fittings 46 (FIG. 7) on the back of the acoustic panel 26 (FIG. 7).

Figure 11:
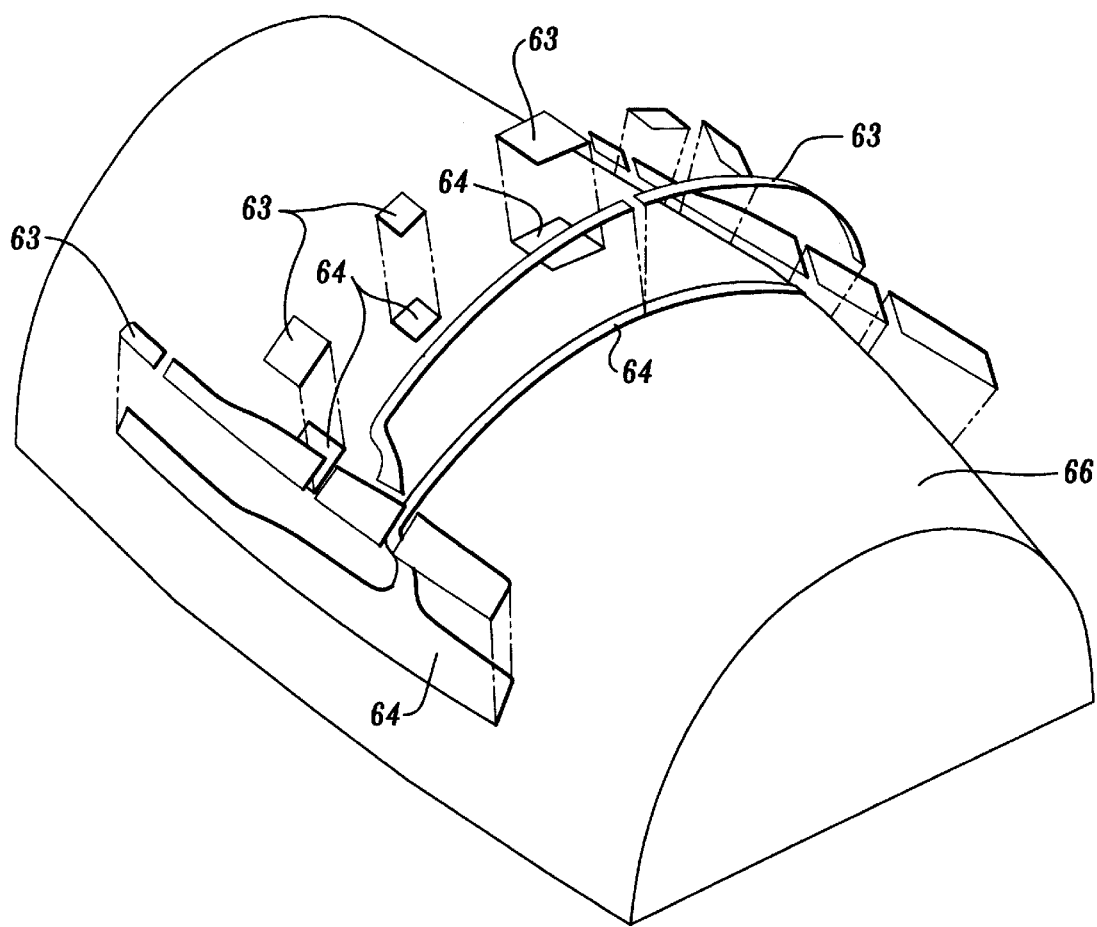
FIG. 11 is an isometric view showing a stage of assembly of a pre-cured doubler for use in the acoustic panel of FIG. 7.
Figure 14:
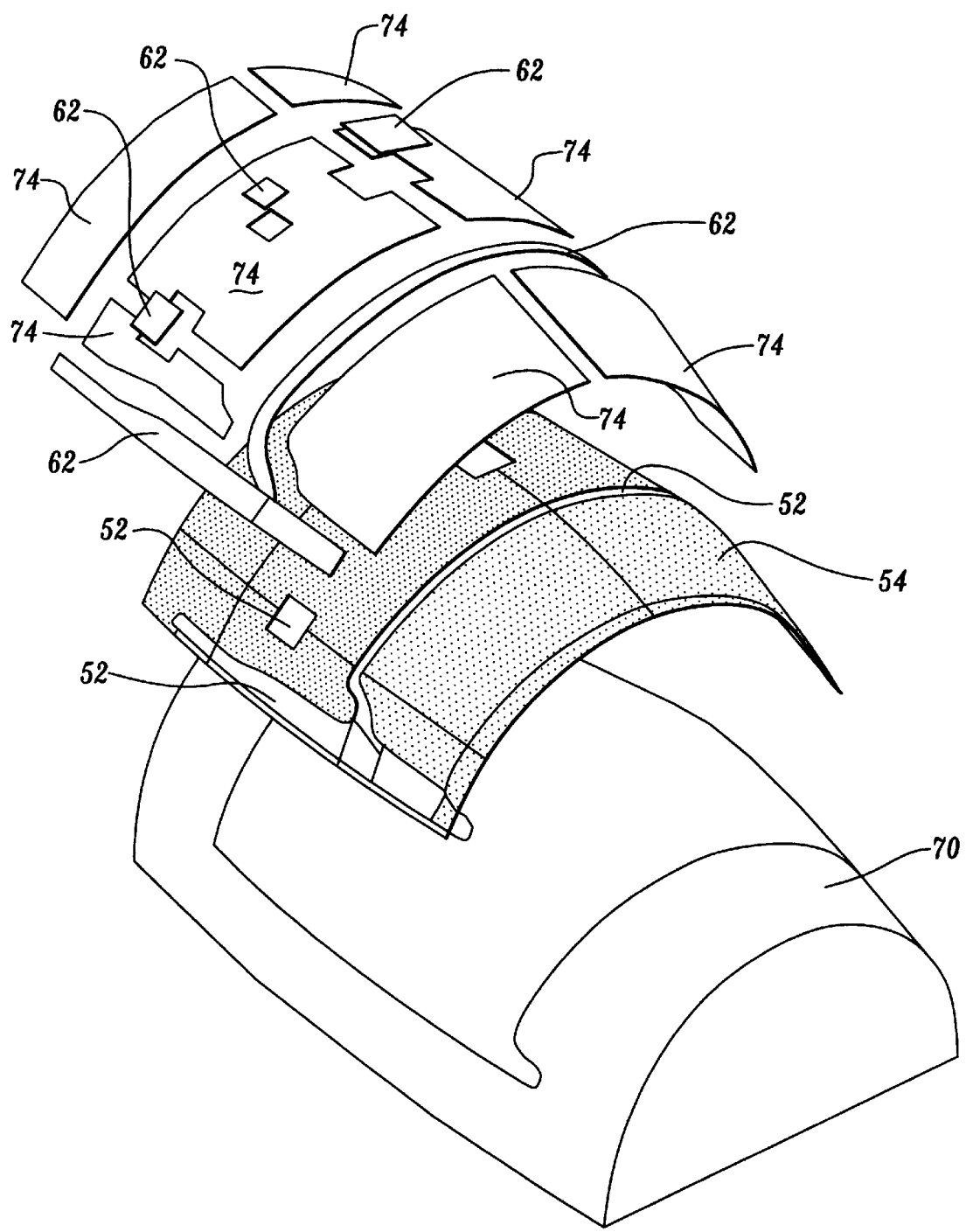
FIG. 14 is an isometric view showing a stage of assembly of the acoustic panel of FIG. 7 in which an acoustic core is formed.

The pre-cured doublers 62 FIG. 14) are formed on a second convex lay-up mandrel 66 shown in FIG. 11. The arrangement of the pre-cured doublers 62 on the second convex lay-up mandrel 66 is preferably the same as the shape of the non-perforated areas 52 of the perforated sheet 54 (FIG. 14). In the embodiment shown, the pre-cured doublers 62, as well as the non-perforated areas 52 of the perforated sheet 54, are arranged in an "H" formation with the sides of the "H" corresponding with the sides of the acoustic panel 26 (FIG. 7) and the central bar of the "H" arranged to extend opposite the fittings 46 (FIG. 7). Four individual pre-cured doublers 62 are located underneath the bar of the "H". It is to be understood that the pre-cured doublers 62 (FIG. 14) can be arranged in any suitable manner so that adequate attachment strength is provided for all fittings 46 (FIG. 7) that attach to the acoustic panel 26 (FIG. 7).

Figure 12:
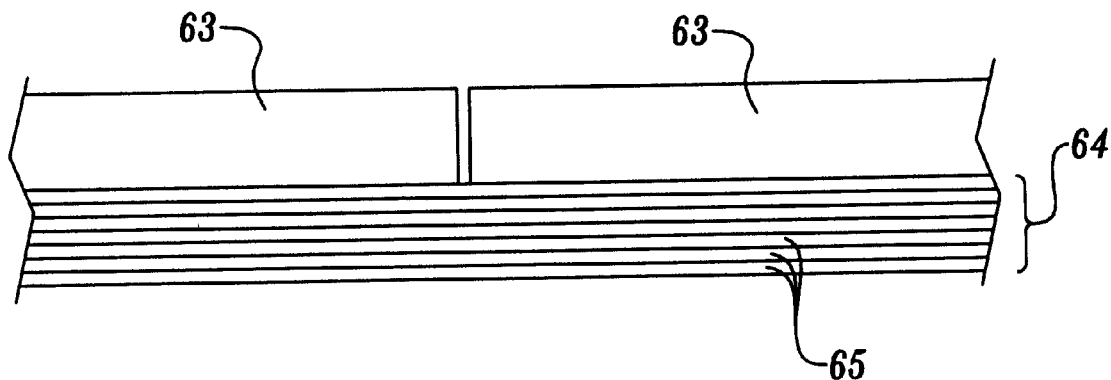
FIG. 12 is a diagrammatic view showing the forming of a pre-cured doubler in accordance with the stage of assembly shown in FIG. 11.

The pre-cured doubler 62 consists of a dense core 63 and a lower face sheet 64. The dense core 63 is preferably a graphite/polyimide dense core. As can be seen in FIG. 12, the lower face sheet 64 is formed by stacking six (6) prepreg sheets 65 on the second convex lay-up mandrel 66 (FIG. 11). The prepreg sheets 65 are preferably interwoven carbon fibers in an epoxy matrix. The prepreg sheets 65 are preferably arranged so that the fibers of the prepreg sheets are aligned +/−45°, 0°/90°, +/−45°, +/−45°, 0°/90°, and +/−45°, respectively, to the longitudinal axis of the second convex lay-up mandrel 66. This longitudinal axis corresponds with the air flow direction of the acoustic panel 26 (FIG. 7).

After the prepreg sheets 65 are arranged on the second lay-up mandrel, sections of the core 63 are cut into desired shapes and glued by an adhesive layer (not shown) to the top of the upper surface of the stack of prepreg sheets 65 (FIG. 12). Foaming adhesive (not shown, but well known in the art) is applied between adjacent sections of the core 63.

After the pre-cured doublers 62 are properly arranged on the second convex lay-up mandrel 66, the pre-cured doublers 62 and the second convex lay-up mandrel 66 are bagged and placed in an autoclave. The pre-cured doublers 62 are then staged, or partially cured.

As stated earlier, the non-perforated areas 52 of the perforated sheet 54 include unidirectional tape 59 extending 0 and 90 degrees to the air flow direction of the acoustic panel 26 and prepreg sheets 58, the majority of which have fibers extending 0 degrees to the air flow direction of the acoustic panel 26. The acoustic doublers 62, on the other hand, have interwoven carbon fiber prepreg sheets 65, the majority of which have carbon fibers aligned +/−45 degrees to the air flow direction. These arrangements are made so that an exemplary interface can be made between the non-perforated areas 52 of the perforated sheet 54 and the pre-cured doublers 62. Preferably, the thicknesses and moduli of elasticity of the pre-cured doublers 62 and the non-perforated areas 52 of the perforated sheet 54 are related substantially by the formula:

$$(E_d)(T_d) = (E_n)(T_n)$$

Where $E_d$ is the modulus of elasticity of the pre-cured doubler 62 in the direction of air flow, $T_d$ is the thickness of the pre-cured doubler 62, $E_n$ is the modulus of elasticity of the non-perforated area 52 in the direction of air flow, and $T_n$ is the thickness of the non-perforated area 52.

The modulus of elasticity is a measure of the stiffness of a material. A stiff material, with a high modulus of elasticity, will elastically deform less than a less stiff material under the same load, assuming that the two materials are the same thickness. The tensile strength, and therefore the modulus of elasticity, of the non-perforated areas 52 of the perforated sheet 54 in the air flow direction is greater than the tensile strength of the pre-cured doublers 62. This is largely because the majority of the fibers in the non-perforated areas 52 of the perforated sheet 54 are aligned in the air flow direction, whereas the majority of the fibers in the pre-cured doublers 62 are aligned at 45° from the air flow direction.

By increasing the thickness of a material, deformation of that material under applied stress will be less. By making the thickness of the pre-cured doublers 62 so that the pre-cured doubler and the non-perforated areas 52 meet the above formula, the pre-cured doubler and the non-perforated areas deform nearly the same amount under force. This permits the non-perforated areas 52 of the perforated sheet 54 to absorb any deformation in the pre-cured doublers 62 which may be caused by stress, avoiding excessive rubbing, wearing, peeling, or seizing between the respective parts.

By matching the moduli of elasticity and thicknesses in this manner, the pre-cured doubler 62 can transmit forces into the non-perforated areas 52 without excessive strain being placed at the bonded interface of the non-perforated areas 52 and the pre-cured doublers 62. Forces are received by the pre-cured doublers 62 and are transferred into the non-perforated areas 52. This permits the strains passed through the pre-cured doublers to transmit to the perforated regions of the perforated sheet 54 without need for a "stepped" or "ramp" region as was described in the background section of this disclosure.

By eliminating a ramped region near areas needing reinforcement, the pre-cured doublers 62 permit the perforations 50 of the perforated sheet 54 to extend up to and against the non-perforated areas 52 of the perforated sheet 50. This construction permits an increase of acoustic area over prior art honeycomb core composite acoustic panels.

After the pre-cured doublers 62 are staged, the perforated sheet 54 and the pre-cured doublers 62 are arranged on a third convex lay-up mandrel 70 (FIG. 14). The upper face of the third convex lay-up mandrel 70 has a contour that substantially matches the final shape of the inner surface of the part being formed, i.e., the acoustic panel 26. The perforated sheet 54 is laid over the upper face of the third convex lay-up mandrel 70. The pre-cured doublers 62 are then attached by an adhesive layer 71 (FIG. 13) to the non-perforated areas 52 of the perforated sheet 54.

The adhesive layer 71 is preferably "elastomeric" in nature, meaning that the adhesive layer 71 is capable of deformation or compression by elastic movement of the relatively moving pre-cured doubler 62 and the non-perforated areas 52 of the perforated sheet 54. The elastomeric qualities of the adhesive layer 71 permit the adhesive layer 71 to be deformed, sheared, or compressed by relative movement between and the pre-cured doubler 62 and the non-perforated areas 52 of the perforated sheet 54, and to absorb the kinetic and sonic energy of the relatively moving surfaces.

The adhesive layer 71 has a memory for its original shape, and resiliently returns the pre-cured doubler 62 and the non-perforated areas 52 of the perforated sheet 54 into their original configuration over a brief period of time. The adhesive layer 71 preferably has a tendency to resist shear, deformation or compression up to and including ultimate load, thus slowing the relative movement of the pre-cured doubler 62 relative to the non-perforated areas 52 of the perforated sheet 54. Thus, the adhesive layer serves as a shock absorber between the pre-cured doubler 62 and the non-perforated areas 52 of the perforated sheet 54. An adhesive layer 71 made of epoxy adhesive, having viscoelastic properties such that the sliding of the pre-cured doubler 62 relative to the non-perforated areas 52 of the perforated sheet 54 is resisted, has been found to be a satisfactory material. Many materials having a relatively low durometer of elasticity, and formed either in a layer or in other configurations sandwiched between or otherwise interconnected to the pre-cured doubler 62 and the non-perforated areas 52 of the perforated sheet 54 are also satisfactory for use in this invention.

The thicker the adhesive layer 71, the more the adhesive layer 71 acts as a shock absorber to transfer forces from the pre-cured doubler 62 to the perforated sheet 54. However, if the adhesive layer 71 is too thick, the adhesive can flow during the curing process from underneath the pre-cured doubler 62 into the perforations 50 surrounding the pre-cured doubler. Therefore, a balance must be made between the need for a shock absorber and the desire not to have the adhesive flow. Applicants have found that a suitable epoxy adhesive thickness is approximately 0.015 inches.

After the pre-cured doublers 62 are attached by the adhesive layer 71 to the top of the non-perforated areas 52 of the perforated sheet 54, fiberglass cores 74 (FIG. 14) are applied over the perforated sheet 54 in the areas not covered by the pre-cured doublers 62. The fiberglass cores 74 preferably include buried septums (not shown, but well known in the art). The fiberglass cores 74 are attached to the perforated areas of the perforated sheet 54 with a layer of adhesive (not shown). The acoustic core 60 is now fully assembled.

Figure 18A:
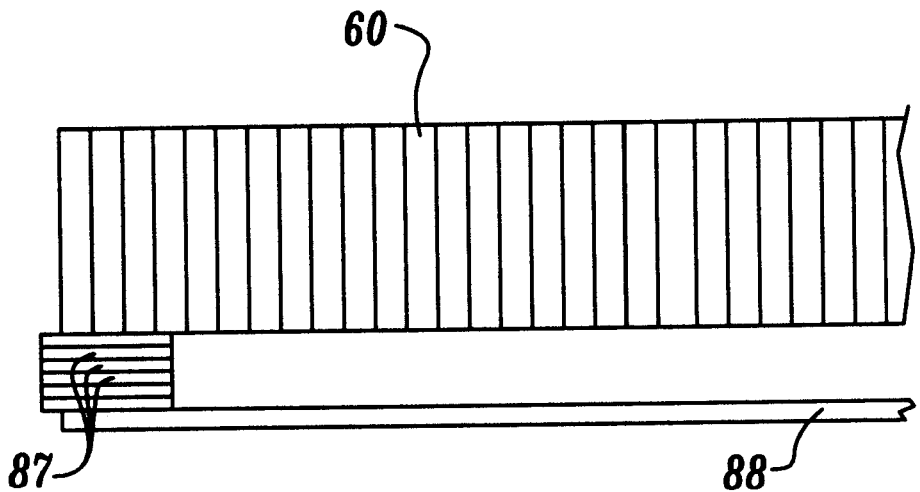
FIG. 18A is a diagrammatic view showing the addition of expanding epoxy strips below the diaphragm core of FIG. 17.
Figure 18B:
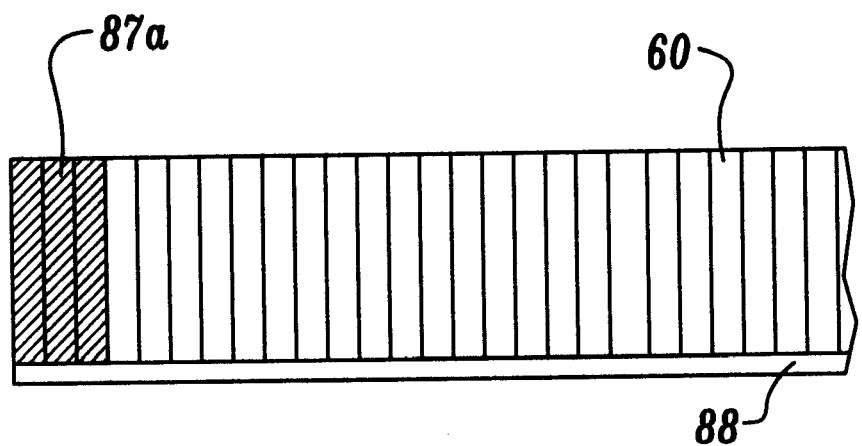
FIG. 18B shows the diaphragm core of FIG. 18A, with expanded epoxy formed in cells of the diaphragm core from the expanding strips shown in FIG. 18A.

Prior to curing, the acoustic core 60, stacks of expanding epoxy strips 87 (FIG. 18A), such as Synspand™ expanding epoxy strips made by Hysol Adhesives of Pittsburgh, Calif., are placed onto a lay-up mandrel 88. The acoustic core 60 is then arranged over the expanding epoxy strips 87 so that expanding epoxy strips are under the edges of the acoustic core (FIG. 18A). The expanding epoxy strips 87 expand during a curing process to form expanded and hardened epoxy 87a (FIG. 18B) that fills adjacent cells of the honeycomb structure of the acoustic core 60. The expanded and hardened epoxy 87a adds structure to and reinforces the honeycomb structure of the fiberglass core 74. The expanding epoxy strips 87a are preferably arranged along the edges of the acoustic core 60 so as to fill the adjacent cells of the acoustic core with expanded and hardened epoxy 87a. Other expanding epoxy strips 87 can be selectively placed in areas that need structure or reinforcement. For example, expanded and hardened epoxy 87a can be used to reinforce the areas surrounding a fastener, eliminating the need for a dense core or potting compound.

Figure 19:
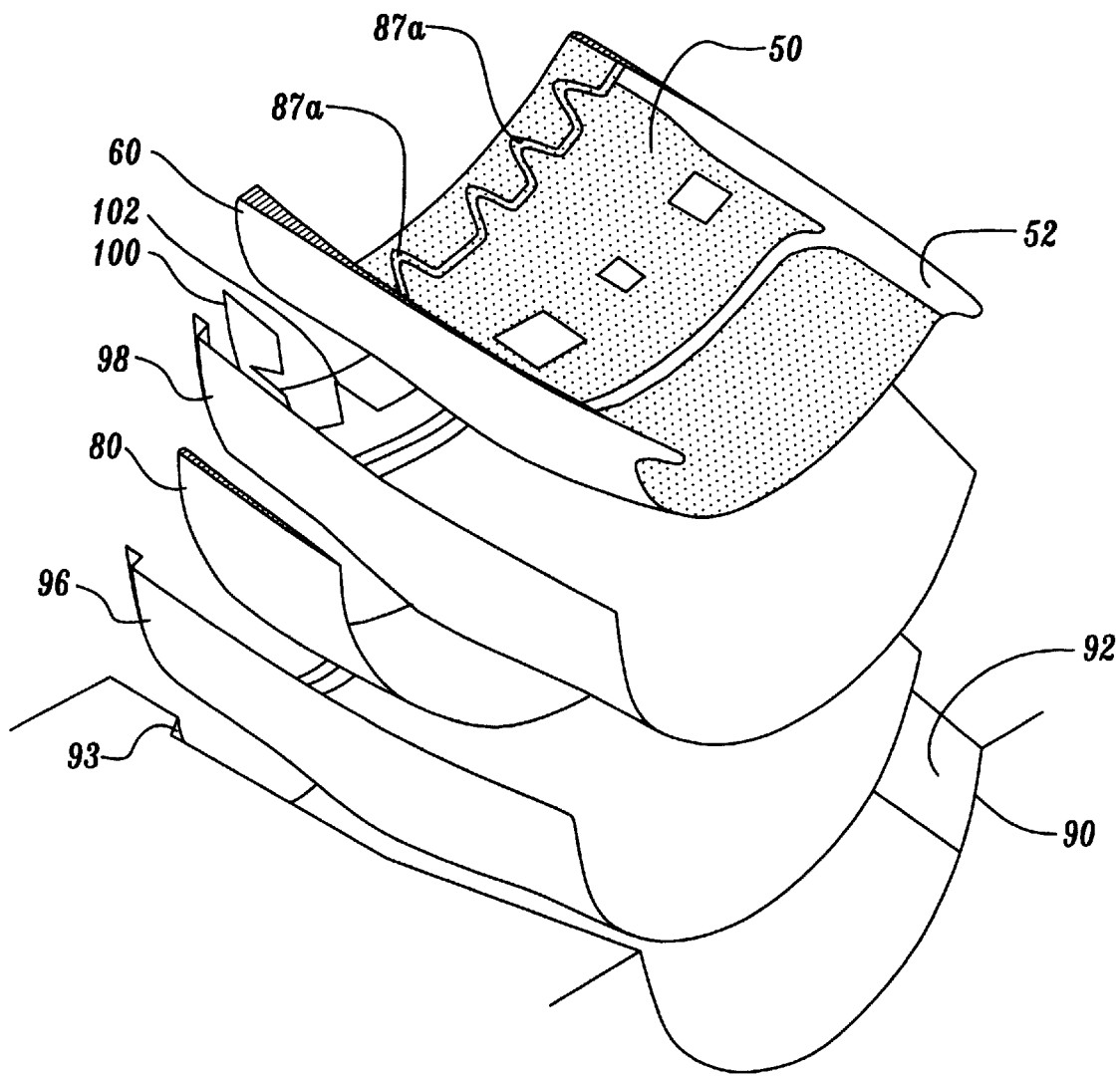
FIG. 19 is an isometric view showing a stage of assembly before final curing of the acoustic panel of FIG. 7.
Figure 20:
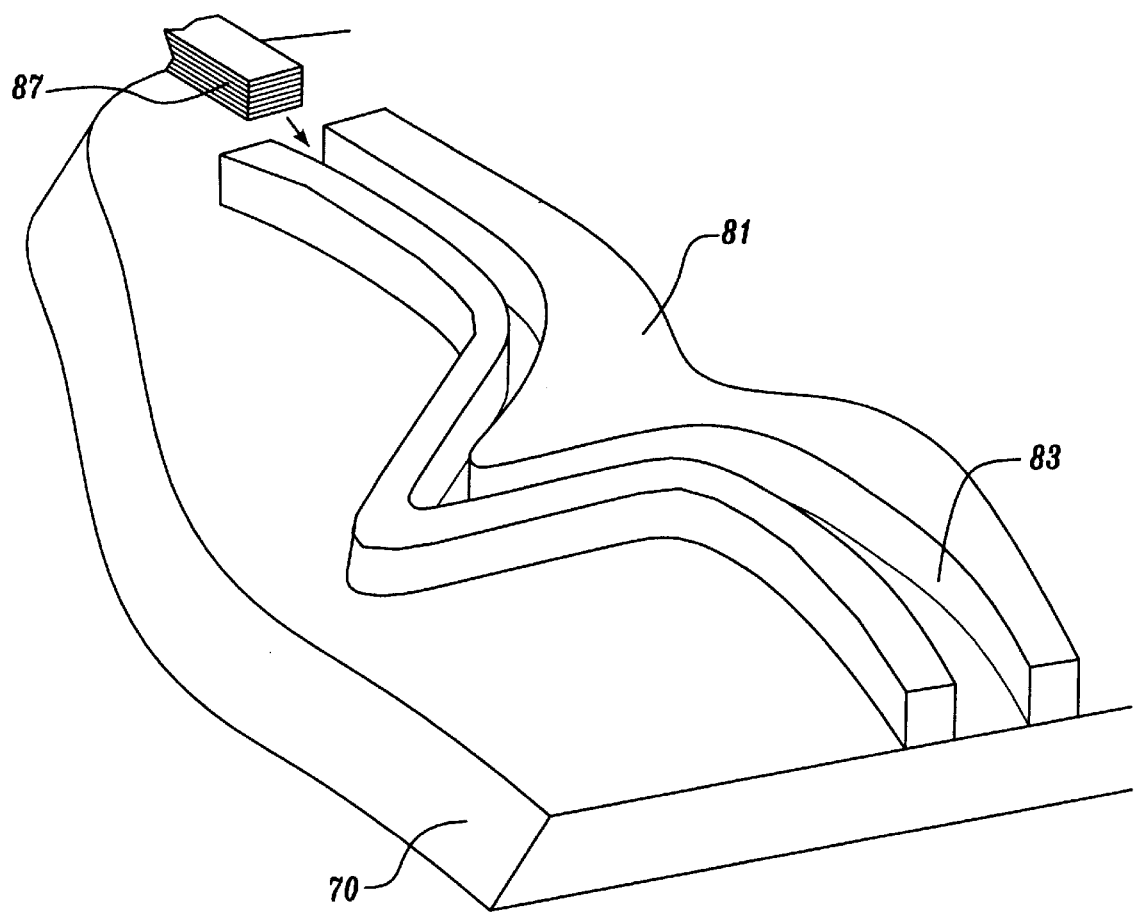
FIG. 20 is an isometric view of the acoustic core of FIG. 19, showing application of expanding epoxy strips to the acoustic core.

The expanding epoxy strips 87 are used to form the periphery for the wedge fairings 44 and the aft wall for the recesses 42. Application of the expanding epoxy strips 87 to this area is shown in FIG. 20. A phenolic guide 81 is provided for positioning the expanding epoxy strips 87 at the proper places above the acoustic core 70. The acoustic core 60 is arranged on a lay-up mandrel. The phenolic guide 81 includes a channel 83 for receiving the expanding epoxy strips 87. The channel 83 is approximately 0.50 inches thick, and is arranged so that it is centered over the eventual contour for the wedge fairings 44 and the aft wall for the recesses 42. The expanded epoxy 87a formed by application through the phenolic guide 81 is shown in the acoustic core 60 in FIG. 19.

During the curing process, the expanding epoxy strips 87 are pulled by suction into the selected honeycomb structure of the acoustic core 60. The expanding epoxy strips 87 require a special curing process to expand into the acoustic core 60 (FIG. 19). First, the expanding epoxy strips 87 are placed onto the lay-up mandrel 70 (FIG. 14) or into the phenolic guide 81 (FIG. 20) and the acoustic core 60 is set in place. The acoustic core 60 and the expanding epoxy strips 87 are then covered with a vacuum bag for applying uniform pressure. The lay-up mandrel 70 is then placed in an autoclave and is heated to 110 degrees Fahrenheit. Vacuum bag pressure is applied so that the softened expanding epoxy strips 87 are forced into the cells of the acoustic core 60. The temperature is raised no more than substantially five degrees Fahrenheit per minute until a temperature of 270 degrees Fahrenheit has been reached. The autoclave is maintained at 270 degrees Fahrenheit for substantially 45 minutes minimum thereby allowing the expanding epoxy strips 87 to fully expand into the cells of the acoustic core 60. The expanded and hardened epoxy 87a is then fixed within the acoustic core 60.

After the pre-cured doublers 62 and the fiberglass cores 74 are situated on the third convex lay-up mandrel 70, a sacrificial sheet 76 (FIG. 16) is laid over the entire structure. The function of the sacrificial sheet 76 will be described in detail below. The third lay-up mandrel 70 is then bagged and placed in an autoclave and the acoustic core 60, including the pre-cured doublers 62, are cured.

Figure 15:
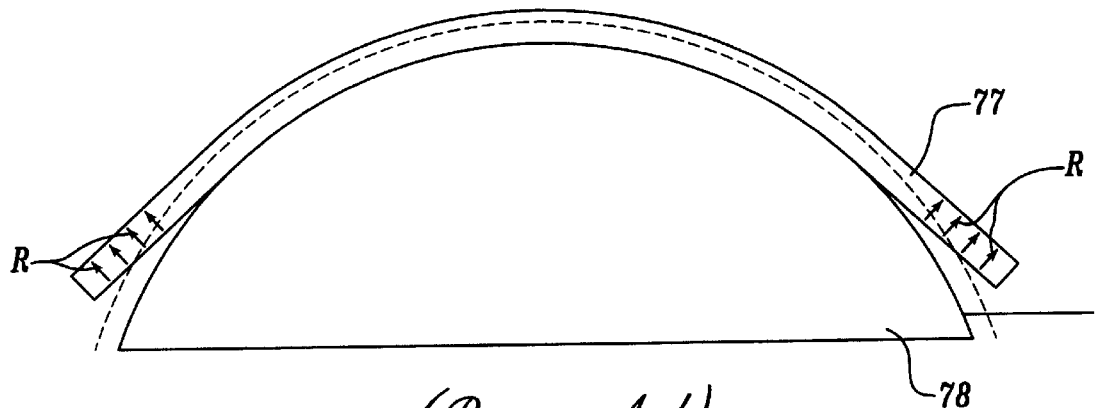
FIG. 15 is a diagrammatic view illustrating warpage in a prior art honeycomb-core composite panel.
Figure 16:
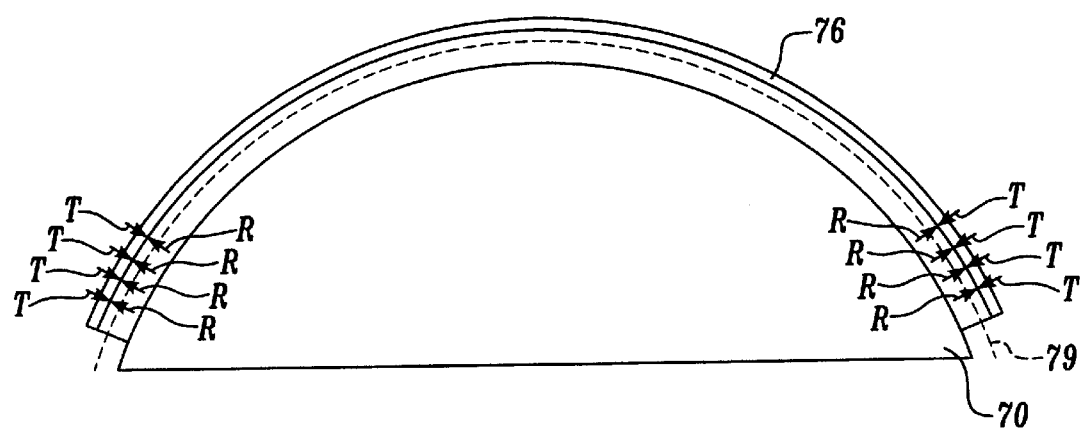
FIG. 16 is diagrammatic view showing the use of a sacrificial sheet in a honeycomb-core composite panel to avoid the warpage shown in FIG. 15.

The sacrificial sheet 76 acts as a structural reinforcement to prevent warpage of the acoustic core 60 during curing. As is known in the art, residual thermal stresses (shown by the arrows at the letter R in the drawings) are produced in honeycomb-core composite panels, such as the acoustic core 60, during cure. As shown in FIG. 15, these residual thermal stresses R cause the edges of a prior art honeycomb-core composite panel 77 to press outward and move away from the surface of a lay-up mandrel 78.

The sacrificial sheet 76 acts as a barrier to prevent the warpage of the panel during and after curing. To perform this function, the sacrificial sheet 76 preferably has good tensile strength and a low coefficient of thermal expansion. An example of an exemplary material to use as the sacrificial sheet 76 is a 0.0045 inch thick sheet of Kevlar®. In addition to having good tensile strength and a low coefficient of thermal expansion, Kevlar® is easy to remove, or has good "peelability", which permits a Kevlar® sheet to be easily removed after cure of the acoustic core 60. Other materials having similar properties can be used.

After the acoustic core 60 is cured, the sacrificial sheet 76 can be removed by peeling or machining. In the preferred embodiment, the sacrificial sheet 76 and approximately ⅟₁₀ inch of the acoustic core 60 are removed by machining, corresponding to the dashed cut line 79 in FIG. 16 (not to scale). The low coefficient of thermal expansion of the sacrificial sheet 76 causes the sacrificial sheet to maintain its shape during and after curing. The tendency of the sacrificial sheet 76 to remain in place places pressure on the outer edges of the acoustic core 60 (shown by the arrows T in FIG. 16) counteracts the thermal residual stresses R within the acoustic core 60, and thus holds the acoustic core 60 against the surface of the third convex lay-up mandrel 70 while the acoustic core is being machined. In this manner, the acoustic core 60 can be machined to within close tolerances.

The residual thermal stresses R within the acoustic core 60 remain after the sacrificial sheet 76 is removed. These residual stresses are useful in the formation of the acoustic panel 26, as is described below.

Figure 17:
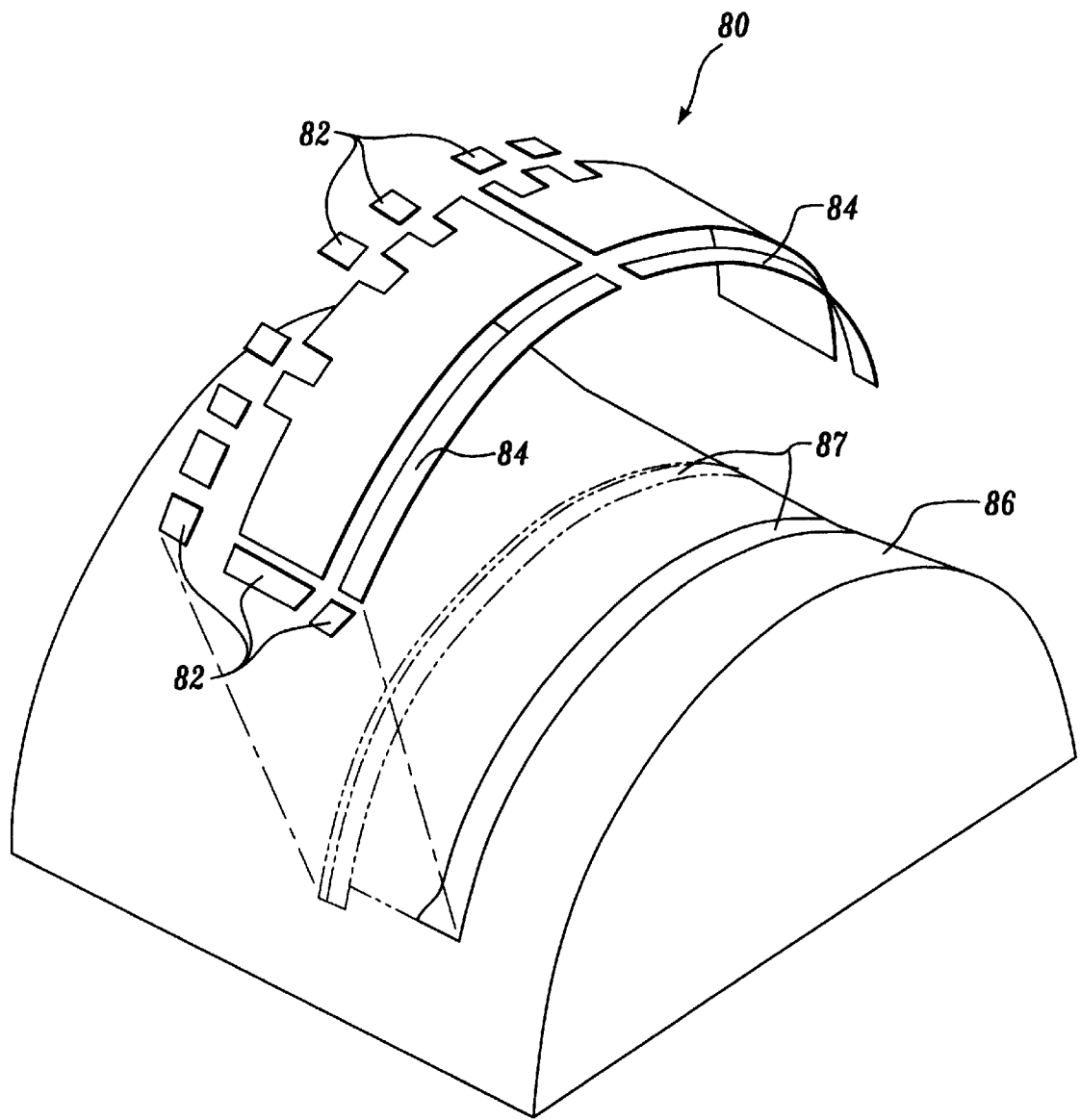
FIG. 17 is an isometric view showing a stage of assembly of a diaphragm core for use in one of the acoustic panels of FIG. 7.
Figure 21:
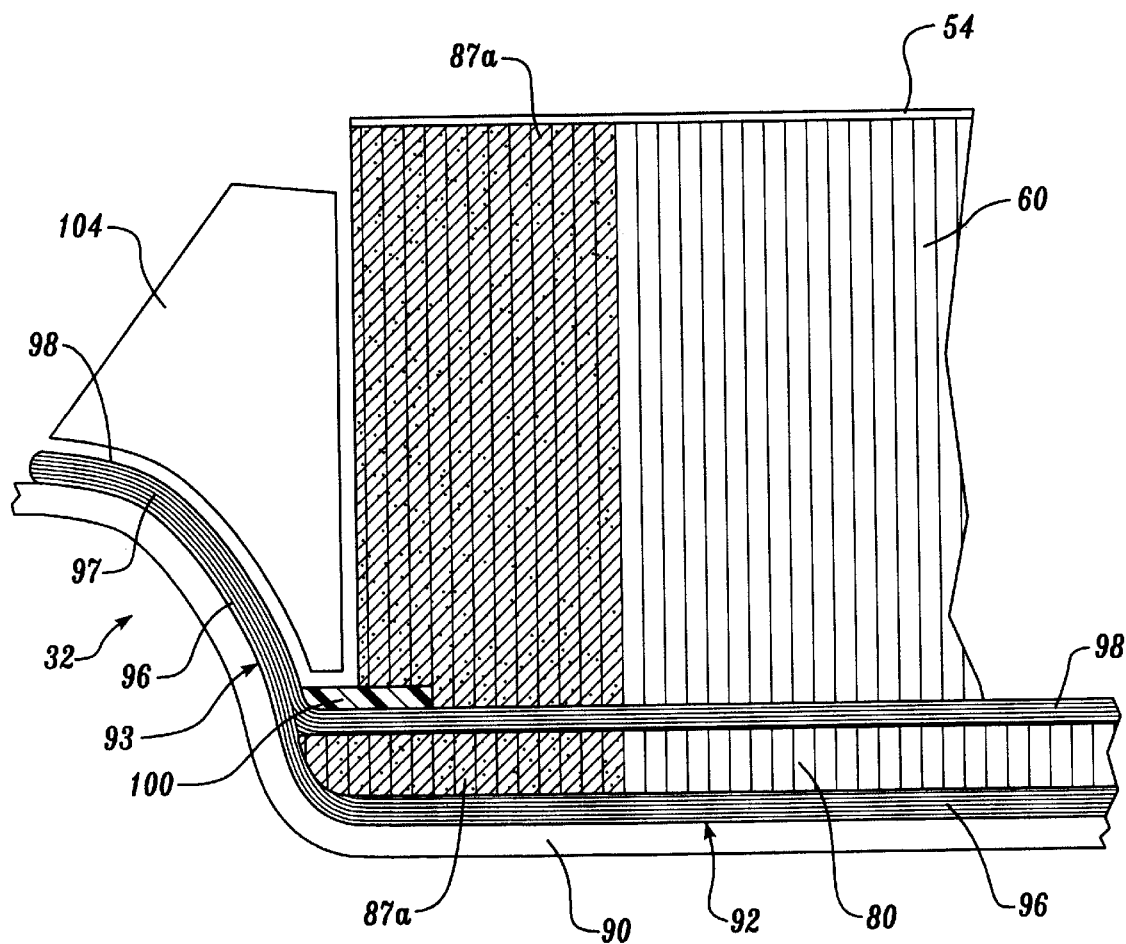
FIG. 21 shows a cross-section, taken fore-to-aft, of the assembly process for the forward ring shown in FIG. 8.

Formation of a diaphragm core 80 is shown in FIG. 17. As can be seen in FIG. 17, the diaphragm core 80 includes dense cores 82 and aramid core pieces 84 that are arranged together on a fourth convex lay-up mandrel 86. Before the dense cores 82 and aramid core pieces 84 are arranged on the fourth convex lay-up mandrel 86, expanding epoxy strips 87 are placed along the forward edge of the location where the dense cores 82 and aramid core pieces 84 are to be placed, the function of which will be described in detail below. The dense cores 82 and aramid core pieces 84 are then arranged on the fourth convex lay-up mandrel 86. The dense cores 82 are positioned so that when the diaphragm core 80 is placed in the acoustic panel 26, the dense cores are directly below the hinge fitting assemblies on the acoustic panel 26. Each of the fiberglass core pieces 84 and the dense cores 82 are joined to adjacent fiberglass core pieces or dense cores by a foaming adhesive (not shown, but well known in the art). The fourth convex lay-up mandrel 86 is then bagged, placed in an autoclave and cured. The expanding epoxy strips 87 expand during the curing process so as to fill the cells at the leading end of the diaphragm core 80 with expanded epoxy 87a (FIG. 21). The diaphragm core 80 is then removed from the fourth convex lay-up mandrel 82 and is ready for final assembly.

Referring now to FIG. 19, a concave lay-up mandrel 90 is used for final assembly and cure of the acoustic panel. The concave lay-up mandrel 90 includes an outer surface 92 that substantially matches the outer surface of the acoustic panel 26, including a forward edge contour 93 (best shown in FIG. 21) that substantially matches the final contour of the forward ring 32. To begin the final assembly, a first wet lay-up of prepreg sheets 96 is situated on the outer surface 92 of the concave lay-up mandrel 90. The prepreg sheets 96 are preferably interwoven fiber impregnated with an epoxy resin. The number of prepreg sheets 96 is preferably three, but any suitable number could be used.

The diaphragm core 80 is fitted against the wet lay-up of prepreg sheets 96 adjacent to the area where the forward ring 32 is to be formed. A second wet lay-up of prepreg sheets 98 is arranged over the diaphragm 40 and the first wet lay-up of prepreg sheets 96. A peelable sheet 100 is laid over the area which corresponds to the recesses 42 that will be formed in the acoustic panel 26. The peelable sheet 100 is a material that does not form a strong bond with the acoustic panel during cure, thus allowing it to be easily removed, or "peeled" from the acoustic panel 26 after curing. An example of a material to use for the peelable sheet 100 is a Kevlar® sheet that is 0.0045 inches thick. The peelable sheet includes triangular cutouts 102 which correspond to the wedge fairings 44 that will be formed in the acoustic panel 26.

As can be seen in FIG. 21, additional prepreg sheets 97 are stacked at the contour of the concave lay-up mandrel 90 where the forward ring 32 is to be formed. Preferably, the number of additional sheets added in this area is ten (10), making sixteen (16) layers of prepreg sheets at the forward ring 32, but any suitable number could be used.

The perforated sheet 54 and the acoustic core 60 are laid over the peelable sheet 100 and the second wet lay-up of prepreg sheets 98. The residual thermal stresses R within the acoustic core 60 cause the outer edges of the acoustic core to press against the surfaces of the peelable sheet 100 and the second wet lay-up of prepreg sheets 98, the benefit of which is described in detail below.

A tooling plug 104 (FIG. 21) is abutted against the leading end of the acoustic core 60 and lays over the prepreg material that is to form the forward ring 32. The tooling plug 104 is preferably covered with a non-stick surface, such as Teflon tape (not shown, but well known in the art) so that the tooling plug will not stick to the prepreg material for the forward ring 32 during curing. The tooling plug 104 is used to hold the prepreg material for the forward ring 32 in place during the curing process.

The entire structure including the concave lay-up mandrel 90 is then bagged and placed in an autoclave for curing. The vacuum bag used during the curing process presses the tooling plug 104 against the forward ring 32. The pressure of the tooling plug 104 against the forward ring 32 maintains the forward ring against the contour 93, thus permitting the forward ring to be formed with the complex geometry of the contour 93.

Figure 22:
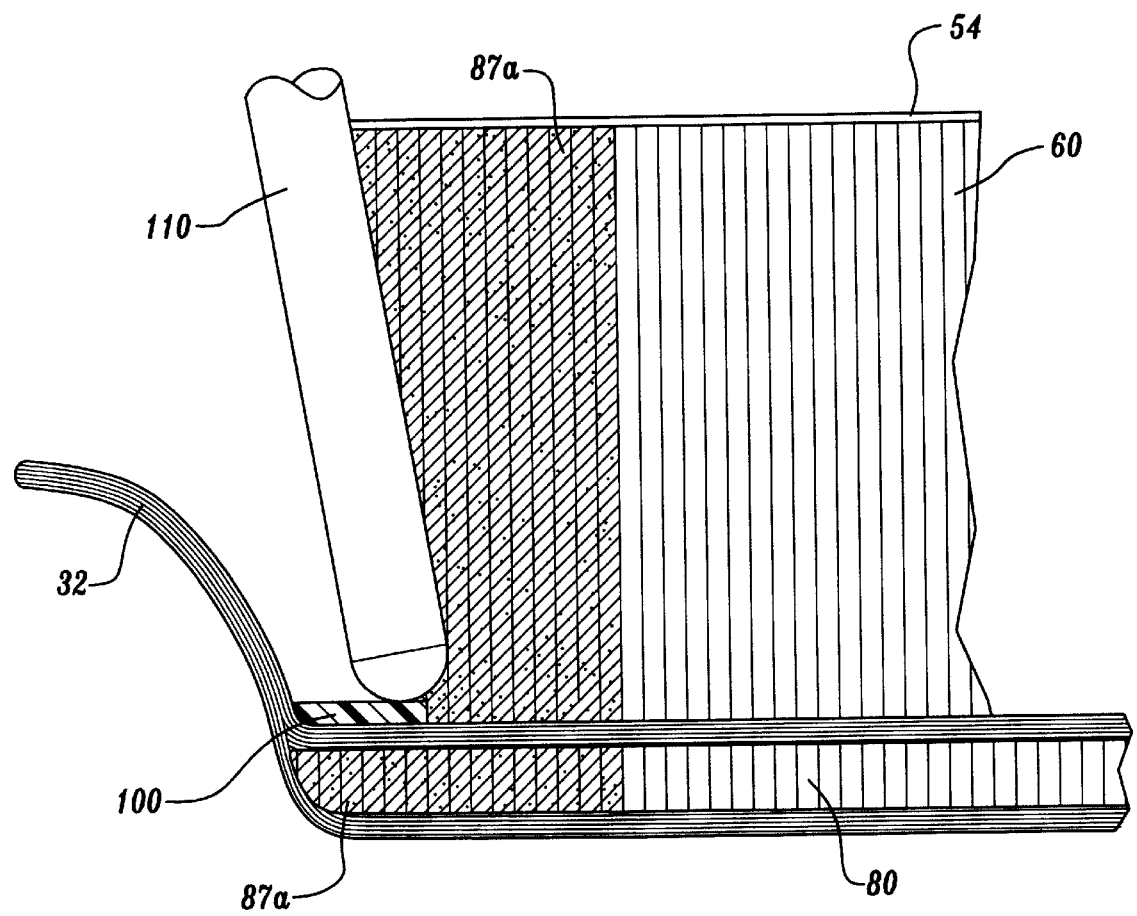
FIG. 22 shows a cross-section, taken fore-to aft, of the assembly process for the wedge fairings of the acoustic panel of FIG. 7.

After curing, the wedge fairings 44 and the recesses 42 are machined out of the forward end of the perforated acoustic core 60. The machining is performed by extending a rotating cutting head 110 (FIG. 22) into the perforated acoustic core 60 and moving the rotating cutting head around the outer edge periphery of the wedge fairings. As can be seen in FIG. 22, the rotating cutting head 110 extends at an angle slightly tilted from 90 degrees with the plane of the acoustic panel 26 so that the rotating cutting head cuts the walls of the wedge fairings 44 at inward angles so that the wedge fairings increase in cross section as they approach the inner side of the acoustic panel 26. The machining by the rotating cutting head 110 occurs in the area of the acoustic core 60 that has expanded and hardened epoxy 87a from the expanding epoxy strips 87 in the cells. The expanded and hardened epoxy 87a leaves a finished surface that requires only finishing or "coating" after machining.

The rotating cutting head 110 extends to within approximately a tenth of an inch of the peelable sheet 100. After machining, the remaining portions of the perforated acoustic core 60 that are in the recesses 42 are broken away. The peelable sheet 100 does not bond completely to the acoustic core 60 or the composite sheet formed by the wet lay-up of prepreg sheets 98. Therefore, the core material not machined off by the rotating cutting head can be easily picked or broken off of the surface of the composite sheet. In this manner, the recesses 42 and the wedge fairings 44 are formed.

The edges of the acoustic panel 26 are then machined by a rotating cutting head so as to expose the expanded and hardened epoxy 87a formed from the expanding epoxy strips 87. As with the area of the recesses 42 and the sides of the wedge fairings 44, the areas require no further machining, sanding, or priming before coating. After coating, the acoustic panel 26 is complete.

The above-described method for forming an acoustic panel 26 offers a structure not present in prior art honeycomb-core composite acoustic panels. This structure offers many advantages over the prior art honeycomb-core acoustic panels. For example, the pre-cured doublers 62 provide increased acoustic area at regions near attached fittings 46.

In addition, the use of the expanding epoxy strips 87 permits the wedge fairings 44 to be formed integral with the acoustic core 60, thus permitting the wedge fairings to have acoustic-absorbing ability. The present inventors have found an increase of acoustic area of at least 29 percent (from 53 to 82 percent) by use of the pre-cured doubler 62 and the integral wedge fairings 44. This increase of acoustic area reduces noise levels from an airplane as much as three decibels during normal operation of a jet engine. In larger nacelle structures, such as in a Boeing 777® airplane, the use of the pre-cured doublers 62 and the integral wedge fairings 44 could increase acoustic area as much as 50 percent. Previous acoustic panels incorporated less than approximately 53 percent or less acoustic area.

The use of the sacrificial sheet 76 permits the acoustic core 60 to maintain its shape during curing without warpage from residual thermal stresses R. The perforated sheet 50 thus maintains a contour that is substantially matched to the outer surface of the third convex lay-up mandrel 70.

Figure 23:
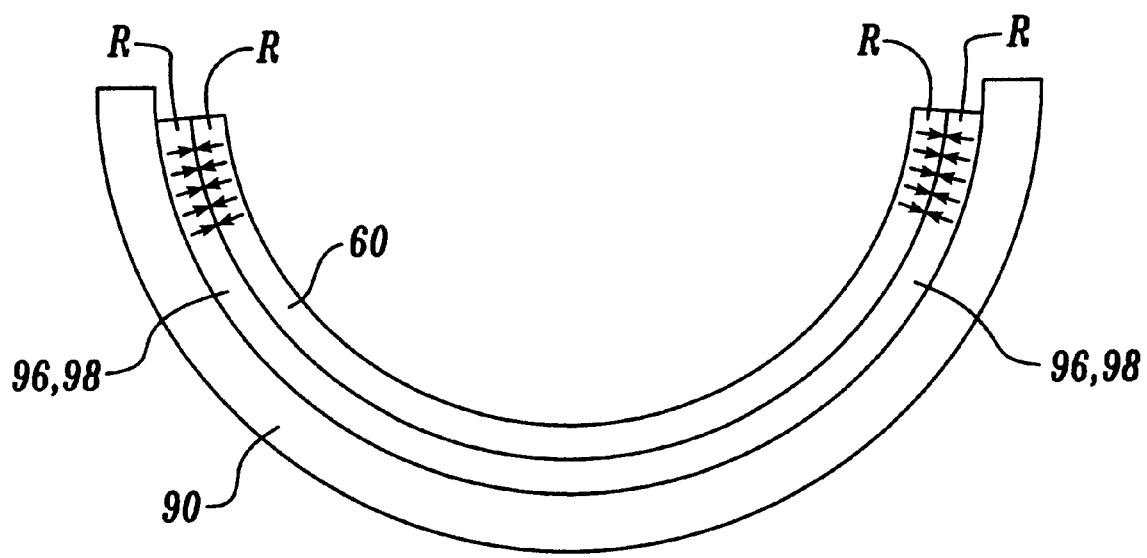
FIG. 23 is a diagrammatic view of an assembled acoustic panel, the view showing off-setting residual thermal stresses within the acoustic panel.

As is shown in FIG. 23, by sequentially forming the acoustic core 60 and then the outer layers 96, 98 of the acoustic panel 26, residual thermal stresses R which are produced in the outer layers during curing in the concave lay-up mandrel 90 are counteracted by the residual thermal stresses in the pre-formed acoustic core 60. The opposing residual thermal stresses R work against each other so that warpage of the acoustic panel 26 does not occur. Therefore, by the process of sequential tooling, residual thermal stresses R within the acoustic panel 26 are substantially eliminated and the inner and outer surfaces of the acoustic panel 26 substantially match the inner and outer surfaces of the concave lay-up mandrel 90 and the convex lay-up mandrel 86. Therefore, unlike the prior art processes of forming stacked honeycomb-core composite panels, the present method permits close tolerances for the inner and outer surfaces of the acoustic panel 26.

Because the inner and outer surfaces of the acoustic panel are formed to close tolerances, shimming and work up of the acoustic panel 26 so as to fit the acoustic panel to the outer cowl panel 24 and attaching hardware on the acoustic panel is not necessary. This benefit decreases the labor time for assembly of the panels by a substantial amount.

The use of the tooling plug 104 in formation of the forward ring 32 permits the complex geometry of the forward ring to be formed simultaneous with forming of the acoustic panel 26. Therefore, the forward ring is formed integral with the acoustic panel 26. This configuration saves much labor time over prior art processes and reduces the number of parts used for an acoustic panel.

The expanding epoxy strips 87 add several advantages to the acoustic panel 26. Use of the expanding epoxy strips 87 for the edge surfaces of the acoustic panel 26 provides an easily machinable surface that requires no further finishing after cutting. Thus, the expanding epoxy strips 87 reduce labor time needed for formation of the acoustic panel 26. In addition, the expanded and hardened epoxy 87*a* is much lighter than potting compounds used in the past, reducing the overall weight of the acoustic panel 26.

The expanding epoxy strips 87 add another advantage to the acoustic panel 26. In prior art honeycomb-core composite panels, ultrasonic inspection was performed on the panels to determine flaws in construction. However, as is described in the Background section of this disclosure, ultrasonic inspection is difficult to perform on complex curvature in the prior art panels. For example, at the leading edge of the diaphragm core 80 (FIG. 21), the diaphragm core tapers to a small cross section and the outer surface of the acoustic panel 26 undergoes drastic curvature at the start of the forward ring 32. Ultrasonic inspection at this curvature is typically not possible because the ultrasonic signals tend to propagate along the acoustic panel 26 instead of through the acoustic panel. By providing expanded and hardened epoxy 87*a* at these regions, ultrasonic inspection can be successfully performed.

While the preferred embodiment of the invention has been illustrated and described with reference to preferred embodiments thereof it will be appreciated that various changes can be made therein without departing from the spirit and scope of the invention as defined in the appended claims.

The embodiments of the invention in which an exclusive property or privilege is claimed are defined as follows:

1. An acoustic panel defining an air flow direction and having reinforced regions thereon, comprising:
   a perforated composite inner sheet having a structural attachment area and a perforated area;
   a composite core arranged over the perforated composite inner sheet, including:
   a first, noise-absorbing core section arranged over the perforated area;
   a second, load receiving, core section arranged over the structural attachment area to receive a load applied to the acoustic panel, the second core section comprising a face sheet connected to the structural attachment area of the perforated composite inner sheet and a structurally-reinforced core material, the structurally-reinforced core material connected to the face sheet, and the width of the face sheet in the air flow direction being substantially equal to the width of the structurally reinforced core material in the air flow direction; and
   an outer composite sheet attached to the composite core so that the first and second core sections extend substantially between the perforated composite inner sheet and the outer composite sheet.

2. The acoustic panel of claim 1, wherein the structural attachment area of the perforated composite inner sheet has a width in the air flow direction which is substantially equal to the width in the air flow direction of the face sheet connected to the structural attachment area, and wherein the relationship between the moduli of elasticity and thicknesses of the face sheet and the structural attachment area is defined substantially by the formula:

$$E_d T_d = E_s T_s;$$

wherein Ed equals the modulus of elasticity of the second core section in the air flow direction, Td equals to thickness of the second core section, Es equals the modulus of elasticity of the structural attachment area in the air flow direction, and Ts equals the thickness of the structural attachment area.

3. The acoustic panel of claim 1, wherein the second core section is attached to the structural attachment area by an elastomeric material.

4. The acoustic panel of claim 3, wherein the elastomeric material is a layer of epoxy adhesive, and wherein the thickness of the elastomeric material is sufficient so that the elastomeric material can act as a shock absorber between the structural attachment area and the second core section, but being thin enough so as to substantially not flow during a curing process for the acoustic panel.

5. The acoustic panel of claim 4, wherein the layer of epoxy adhesive is approximately 0.015 inches thick.

6. The acoustic panel of claim 1, wherein the perforations of the perforated composite inner sheet extend to adjacent to the face sheet.

7. The acoustic panel of claim 1, wherein the face sheet comprises layers of carbon fiber/resin matrix sheets, and wherein each of the layers is substantially equal in width in the airflow direction.

8. An acoustic panel defining an air flow direction and having reinforced regions thereon, comprising:

a perforated composite inner sheet having perforations and a structural attachment area thereon;

a reinforcement structure arranged to receive a load applied to the acoustic panel, the reinforcement structure comprising a face sheet connected to the structural attachment area of the perforated composite inner sheet and arranged over the perforated composite inner sheet, the relationship between the moduli of elasticity and thicknesses of the reinforcement structure and the structural attachment area being defined substantially by the formula:

$$E_d T_d = E_s T_s;$$

wherein Ed equals the modulus of elasticity of the reinforcement structure in the air flow direction, Td equals to thickness of the reinforcement structure, Es equals the modulus of elasticity of the structural attachment area in the air flow direction, and Ts equals the thickness of the structural attachment area; and an outer composite sheet arranged over the composite core.

9. The acoustic panel of claim 8, wherein the reinforcement structure comprises:
a face sheet connected to the structural attachment area of the perforated composite inner sheet; and
a structurally-reinforced core material, the structurally-reinforced core material connected the face sheet, and wherein the structural attachment area of the perforated composite inner sheet has a width in the air flow direction which is substantially equal to the width in the airflow direction of the face sheet connected to the structural attachment area.

10. The acoustic panel of claim 9, wherein the face sheet comprises layers of carbon fiber/resin matrix sheets, and wherein each of the layers is substantially equal in width in the airflow direction.

11. The acoustic panel of claim 9, wherein the face sheet comprises layers of carbon fiber/resin matrix sheets, and wherein the layers of carbon fiber/resin matrix sheets are substantially equal in width in the airflow direction.

12. The acoustic panel of claim 11, wherein the face sheet comprises interwoven carbon fibers, and wherein the majority of the interwoven carbon fibers are aligned substantially plus/minus 45° to the air flow direction.

13. The acoustic panel of claim 12, wherein the structural attachment area comprises layers of carbon fiber/resin matrix sheets, and wherein the majority of the carbon fibers in the structural attachment area are aligned in the air flow direction.

14. The acoustic panel of claim 8, wherein the reinforcement structure is attached to the structural attachment area by an elastomeric material.

15. The acoustic panel of claim 14, wherein the elastomeric material is a layer of epoxy adhesive.

16. The acoustic panel of claim 15, wherein the layer of epoxy adhesive is approximately 0.015 inches thick.

17. The acoustic panel of claim 8, wherein the perforations of the perforated composite inner sheet extend to adjacent to the reinforcement structure.

18. A composite part comprising:
an inner composite sheet;
a honeycomb core having cells extending substantially perpendicular to the inner composite sheet;
an outer composite sheet aligned against the outer side of the honeycomb core; and expanded and hardened epoxy in cells along the outer edges of the honeycomb core, the expanded and hardened epoxy extending from the inner composite sheet to the outer composite sheet so that the expanded and hardened epoxy is exposed outwardly from between the inner composite sheet and the outer composite sheet so that the expanded and hardened epoxy forms outer edges of the composite part.

19. A method of forming a composite part comprising:
providing a composite inner sheet;
providing a honeycomb core having cells;
providing an expandable epoxy;
placing the expandable epoxy adjacent to selected cells of the honeycomb core that will form an edge of the composite part;
curing the expandable epoxy in so as to expand within the selected cells and to harden the expandable epoxy within the selected cells;
attaching the composite inner sheet to the honeycomb core;
attaching a composite outer sheet to the side of the honeycomb core opposite the composite inner sheet; and
machining the outer edges of the honeycomb core so that the expanded and hardened epoxy forms side edges of the composite part.

20. A honeycomb core composite acoustic panel comprising:
a composite inner sheet;
a central honeycomb core attached to the outer surface of the composite inner sheet, the honeycomb core having cells extending substantially perpendicular to the surface of the composite inner sheet;
an outer composite sheet attached to the outer surface of the honeycomb core, the composite outer sheet extending substantially parallel to the composite inner sheet over the majority of the honeycomb core composite acoustic panel, the inner composite sheet rolling upward toward the outer composite sheet at one edge of the honeycomb core composite acoustic panel so that the honeycomb core decreases in height at the one edge; and
expanded and hardened epoxy in the cells at the one edge.

21. The honeycomb composite acoustic panel of claim 20, wherein the honeycomb composite panel is an acoustic panel.

22. The honeycomb core composite panel of claim 20, wherein the acoustic panel includes a forward ring and a diaphragm, the diaphragm extending from the forward ring rearward, and wherein the edge of the diaphragm closest to the forward ring is the one edge.

23. An acoustic panel for a nacelle of a high bypass jet engine, the acoustic panel comprising:
structural reinforcements within the acoustic panel to provide sufficient structure to permit the connection components of a nacelle of a high bypass jet engine to the acoustic panel;
an inner surface configured to face a jet engine; and
an acoustic area extending along the inner surface, defined by perforations in the surface, the acoustic area comprising greater than 60% of the inner surface.

24. The acoustic panel of claim 23, wherein the acoustic area comprises greater than 80% of the inner surface.

25. The acoustic panel of claim 23, wherein the acoustic panel further comprises wedge fairings that extend over the inner surface.

26. An acoustic panel defining an air flow direction and having reinforced regions thereon, comprising:
- a perforated composite inner sheet having a structural attachment area thereon;
- a composite core arranged over the perforated composite inner sheet, including:
  - a first, noise-absorbing, core section;
  - a second core section arranged to receive a load applied to the acoustic panel, the second core section comprising a face sheet connected to the structural attachment area of the perforated composite inner sheet and a structurally-reinforced core material, the structurally-reinforced core material connected the face sheet, and the width of the face sheet in the air flow direction being substantially equal to the width of the structurally reinforced core material in the air flow direction, and the structural attachment area of the perforated composite inner sheet has a width in the air flow direction which is substantially equal to the width in the air flow direction of the face sheet connected to the structural attachment area; and
- an outer composite sheet attached to the composite core;
- the relationship between the moduli of elasticity and thicknesses of the face sheet and the structural attachment area is defined substantially by the formula:

$$E_d T_d = E_s T_s;$$

wherein Ed equals the modulus of elasticity of the second core section in the air flow direction, Td equals to thickness of the second core section, Es equals the modulus of elasticity of the structural attachment area in the air flow direction, and Ts equals the thickness of the structural attachment area.

27. The acoustic panel of claim 26, wherein the face sheet comprises layers of carbon fiber/resin matrix sheets, and wherein the layers of carbon fiber/resin matrix sheets are substantially equal in width in the airflow direction.

28. The acoustic panel of claim 27, wherein the face sheet comprises interwoven carbon fibers, and wherein the majority of the interwoven carbon fibers are aligned substantially plus/minus 45° to the air flow direction.

29. The acoustic panel of claim 28, wherein the structural attachment area comprises layers of carbon fiber/resin matrix sheets, and wherein the majority of the carbon fibers in the structural attachment area are aligned in the air flow direction.

30. The acoustic panel of claim 26, wherein the second core section is attached to the structural attachment area by an elastomeric material.

31. The acoustic panel of claim 30, wherein the elastomeric material is a layer of epoxy adhesive, and wherein the thickness of the elastomeric material is sufficient so that the elastomeric material can act as a shock absorber between the structural attachment area and the second core section, but being thin enough so as to substantially not flow during a curing process for the acoustic panel.

32. The acoustic panel of claim 31, wherein the layer of epoxy adhesive is approximately 0.015 inches thick.

33. An acoustic panel defining an air flow direction and having reinforced regions thereon, comprising:
- a perforated composite inner sheet having a structural attachment area thereon;
- a composite core arranged over the perforated composite inner sheet, including:
  - a first, noise-absorbing, core section having a buried septum;
  - a second core section arranged to receive a load applied to the acoustic panel, the second core section comprising (1) a face sheet connected to the structural attachment area of the perforated composite inner sheet by an epoxy adhesive having a thickness of approximately 0.015 inches, and (2) a structurally-reinforced core material connected to the face sheet, and the width of the face sheet in the air flow direction being substantially equal to the width of the structurally reinforced core material in the air flow direction; and
- an outer composite sheet attached to the composite core.

34. An acoustic panel for a nacelle of a high bypass jet engine, the acoustic panel comprising:
- an inner surface configured to face a jet engine;
- wedge fairings that extend over the inner surface; and
- an acoustic area extending along the inner surface, defined by perforations in the surface, the acoustic area comprising greater than 60% of the inner surface.

35. A method of forming a honeycomb core composite panel comprising:
- providing a composite inner sheet;
- providing a honeycomb core having cells;
- placing an expandable epoxy within a guide;
- arranging the guide so that the expandable epoxy is adjacent to selected cells of the honeycomb core;
- curing the expandable epoxy so that it expands out of the guide and into the selected cells and is hardened within the selected cells;
- attaching the composite inner sheet to the honeycomb core; and
- attaching a composite outer sheet to the side of the honeycomb core opposite the composite inner sheet.

* * * * *

UNITED STATES PATENT AND TRADEMARK OFFICE
CERTIFICATE OF CORRECTION

PATENT NO. : 5,975,237
DATED : November 2, 1999
INVENTOR(S) : J.M. Welch et al.

It is certified that error appears in the above-indentified patent and that said Letters Patent is hereby corrected as shown below:

| COLUMN | LINE | ERROR |
|---|---|---|
| [57] Pg. 1, col. 2 | Abstract 9 of text | after "is connected" insert --to-- |
| [57] Pg. 1, col. 2 | Abstract 14 of text | "increase" should read --increased-- |
| 16 (Claim 2, | 42 line 14) | "equals to thickness" should read --equals the thickness-- |
| 17 (Claim 8, | 17 line 20) | "equals to thickness" should read --equals the thickness-- |
| 18 (Claim 19, | 16 line 8) | after "epoxy" delete "in" |
| 19 (Claim 26, | 13 line 13) | after "connected" insert --to-- |

UNITED STATES PATENT AND TRADEMARK OFFICE
CERTIFICATE OF CORRECTION

Page 2 of 2

PATENT NO. : 5,975,237
DATED : November 2, 1999
INVENTOR(S) : J.M. Welch et al.

It is certified that error appears in the above-indentified patent and that said Letters Patent is hereby corrected as shown below:

| COLUMN | LINE | ERROR |
|---|---|---|
| 19 (Claim 26, | 33 line 33) | "equals to thickness" should read --equals the thickness-- |

Signed and Sealed this

Twenty-seventh Day of March, 2001

*Attest:*

NICHOLAS P. GODICI

*Attesting Officer*    Acting Director of the United States Patent and Trademark Office